US005540319A

United States Patent [19]
Orisaka et al.

[11] Patent Number: 5,540,319
[45] Date of Patent: Jul. 30, 1996

[54] CONVEYING SYSTEM AND METHOD FOR A PRODUCTION LINE

[75] Inventors: Eiji Orisaka; Shingo Yamauchi; Toyonori Okuyama; Kenji Manabe, all of Toyota; Mitsumoto Inoguchi, Nishikamo-gun, all of Japan

[73] Assignee: Toyota Jidosha Kabushiki Kaisha, Japan

[21] Appl. No.: 282,749

[22] Filed: Jul. 29, 1994

[30] Foreign Application Priority Data

Jul. 29, 1993 [JP] Japan .................................. 5-188498
Apr. 26, 1994 [JP] Japan .................................. 6-088917

[51] Int. Cl.$^6$ ................................................ B65G 25/00
[52] U.S. Cl. ............................ 198/465.3; 198/465.2; 198/795
[58] Field of Search ............................ 198/465.1, 465.2, 198/465.3, 577, 579, 580, 795

[56] References Cited

U.S. PATENT DOCUMENTS

| 3,690,433 | 9/1972 | Buldini | 198/465.3 X |
|---|---|---|---|
| 3,974,778 | 8/1976 | Black et al. | |
| 4,359,000 | 11/1982 | Tokunaga | 198/465.2 X |
| 5,090,555 | 2/1992 | Kura | 198/465.2 X |
| 5,195,629 | 3/1993 | Gottstein et al. | 198/465.2 |

FOREIGN PATENT DOCUMENTS

| 1200543 | 9/1965 | Germany | 198/795 |
|---|---|---|---|
| 1-192610 | 8/1989 | Japan . | |
| 2-102864 | 4/1990 | Japan . | |
| 2-102865 | 4/1990 | Japan . | |
| 2-212261 | 8/1990 | Japan . | |
| 3-239661 | 10/1991 | Japan . | |
| 4-310463 | 11/1992 | Japan . | |
| 5-85357 | 4/1993 | Japan . | |
| 1374894 | 11/1974 | United Kingdom . | |
| 1573197 | 8/1980 | United Kingdom . | |

*Primary Examiner*—James R. Bidwell
*Attorney, Agent, or Firm*—Oliff & Berridge

[57] ABSTRACT

A conveying system in a production line for conveying a plurality of objects includes a conveying route. The conveying route comprises first rails and second rails, extending in the different directions and intersecting each other. Each object has a driven portion including a moveable section pivotably supported on the object. The conveying system includes a plurality of conveying units. A first conveying unit has a mechanism for advancing rollers, which are pressed against the driven portion of an object, toward an intersection, when the object travelling on the first rails nears an intersection, and for retracting the rollers from the driven portion when the object enters the intersection. A second conveying unit has a mechanism for advancing the rollers toward the intersection when the object is in the intersection, and for advancing the rollers away from the intersection toward a third conveying unit when both rollers are pressed against the driven portion of the object in the intersection. The intersection has a mechanism for turning the movable section from extending in the direction of the first rails to extending in the direction of the second rails for changing the conveying direction of the object.

23 Claims, 30 Drawing Sheets

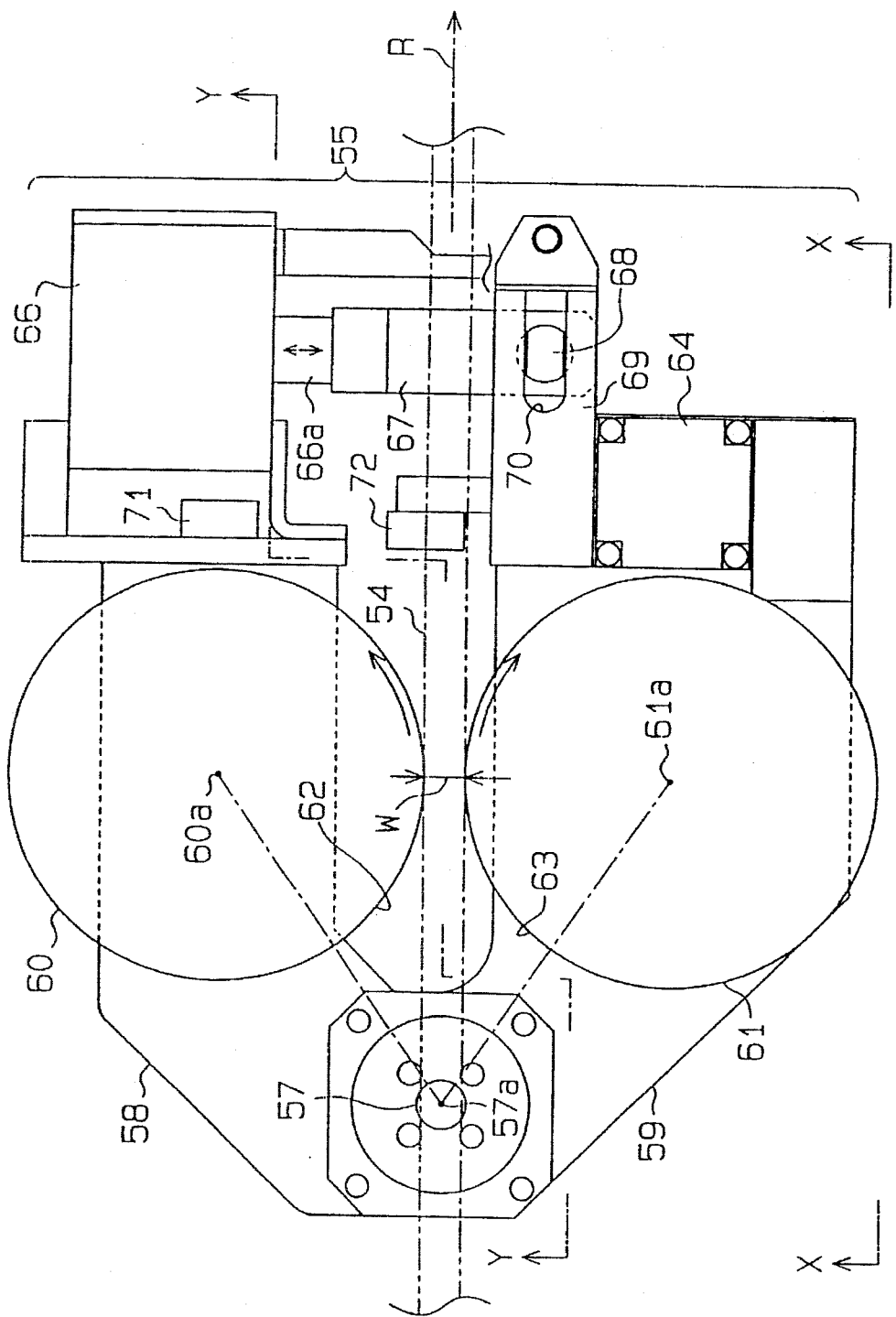

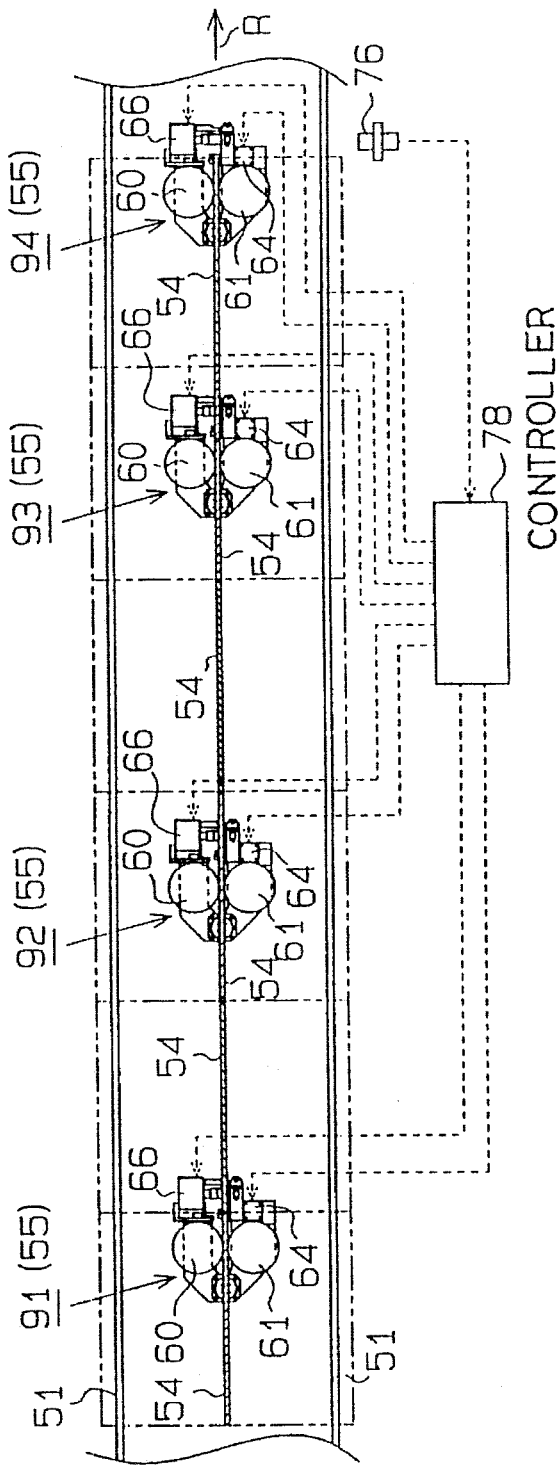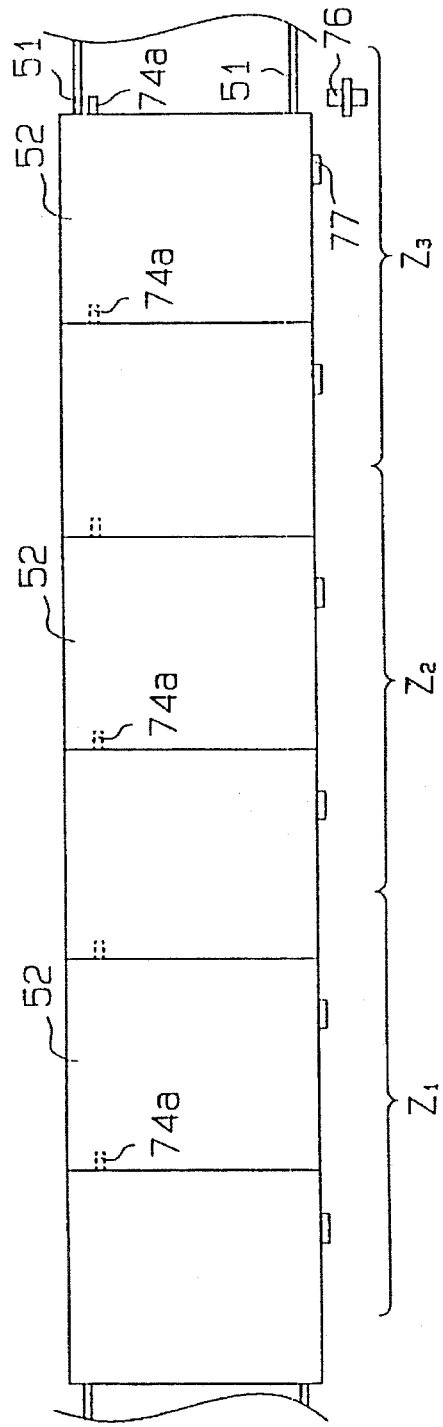

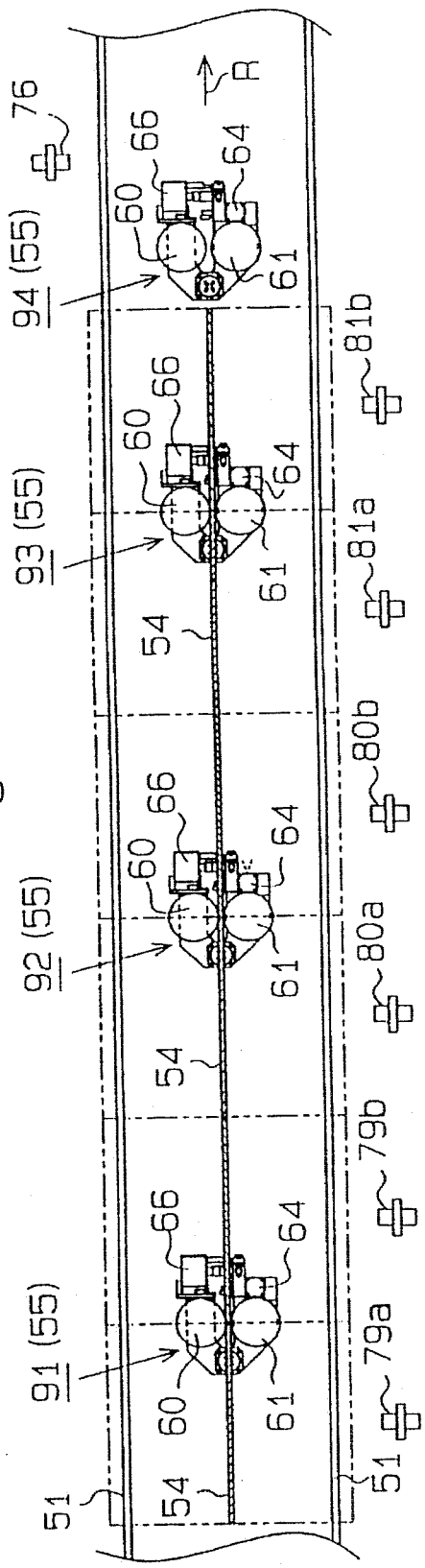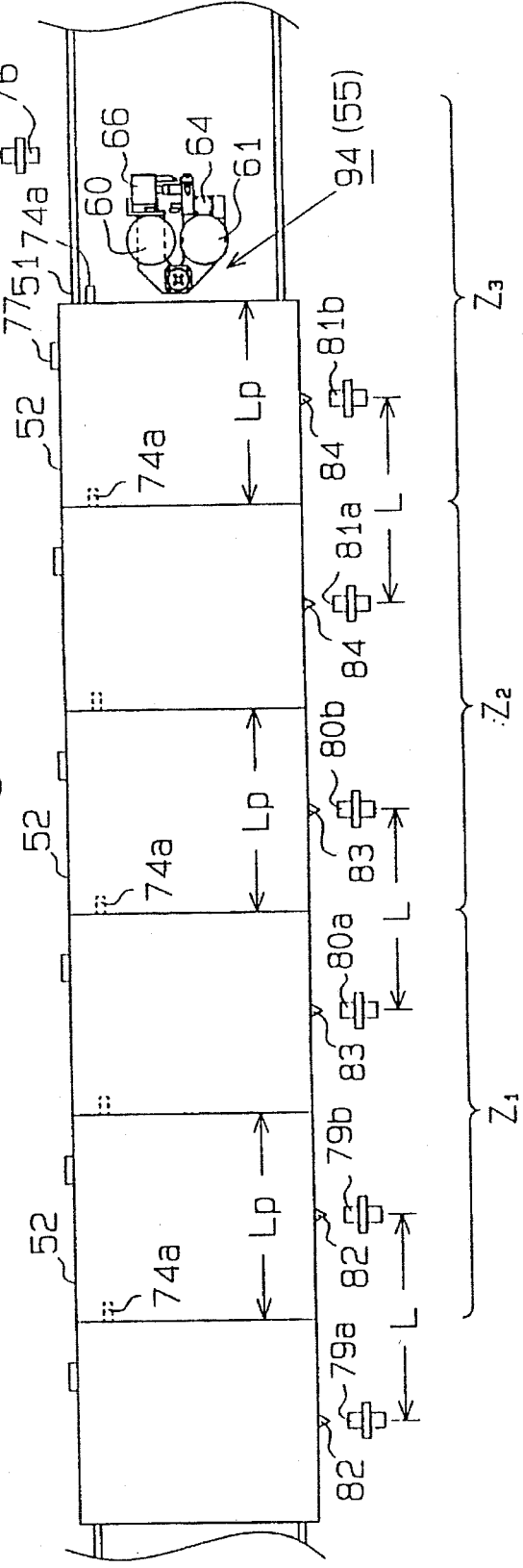

CONVEYING SYSTEM AND METHOD FOR A PRODUCTION LINE

BACKGROUND OF THE INVENTION

1. Field of the Invention

The present invention relates to systems and methods for conveying carts, pallets or the like in production lines. More particularly, the present invention relates to conveying systems arid methods for production lines where a plurality of carts, pallets or the like loaded with parts are conveyed in contact with each other along a conveying route.

2. Description of the Related Art

An apparatus for conveying a plurality of carts, pallets or the like which are in contact with each other in series is disclosed in the Japanese Unexamined Patent Publication Nos. 2-102865 and 5-85357.

In these conveying apparatuses, a driving conveying unit for driving a cart is disposed along a conveying route, and a braking conveying unit for braking a cart is disposed at downstream of the driving conveying unit. Both conveying units cooperate with one another for smoothly moving plurality of carts to a position near the braking conveying unit while preventing them from separating from each other.

More specifically, as shown in FIGS. 44 and 45, a plate-like driven portion 102 extending in the conveying direction is attached to the underside of each cart 101. In a driving conveying unit 103, the rotation of a drive motor 104 is transmitted to a roller 108A via a shaft 105A, a drive gear 106A and a rotating shaft 107A. The rotation of the drive motor 104 is also transmitted to a roller 108b via the drive gear 106A, a drive gear 106B and a rotating shaft 107B. As a result of such transmission of rotation, two rollers 108A and 108B rotate in the opposite directions. When movement of a cylinder rod 109 causes a lever 110 to pivot, a swing member 112B pivots about a shaft 105B via the shaft 105B and an interlocking gear 111B. A swing member 112A pivots about a shaft 105A via interlocking gears 111B and 111A. The driven portion 102 is clamped by the roller 108A on the swing member 112A and the roller 108B on the swing member 112B, thereby conveying the cart 101, an object to be conveyed, on both rails 113.

In the driving conveying unit 103, the rotary shaft 107A, 107B of each roller 108A, 108B is always axisymmetric with respect to the conveying route 114. Hence, if the extending direction of the driven portion 102 and the conveying route 114 intersect due to an error in mounting the driven portion 102 to the cart 101, the rollers 108A and 108B will impose an excessive force on the driven portion 102. As a result, a load is applied to wheels 115 and the related components of the cart 101, resulting in the unsmooth travel of the cart 101.

Accordingly, it is necessary to precisely mount the driven portion 102 between the rotary shafts 107A and 107B of both rollers 108A and 108B. However, this installation work is quite troublesome, and may consequently increases manufacturing costs.

Furthermore, since the driving and braking units are used for conveying the cart 101, the extension work of a production line requires the adjustment of the spacing between two units. For this purpose, the position of the braking unit is to be changed, or the conveying capability of the conveying unit 103 is to be increased. In the extreme case, additional pairs of conveying units should be provided. This makes the extension work difficult.

Moreover, each cart should contact adjacent carts when be conveyed between the conveying units. This causes a pressing force to constantly act on each cart in the conveying direction. Each cart, therefore, is required to be rigid sufficiently to resist the pressing force, with a resultant increase in manufacturing costs. Another disadvantage is that the driving force of the driving unit is nullified by the counter braking force of the braking unit. Accordingly, the carts should be pushed, preferably under a uniform contact pressure, in the conveying direction for successive conveyance.

Conceivable measures for achieving this object will be discussed below.

For improving the functions of the conveying unit, the following measure is proposed. The rollers may be arranged to press against the driven portion of each cart with a substantially constant force for substantially equalize transmitting the power from the rollers to the driven portion. This allows the conveying speed of each cart to be identical. For this purpose, the rotating speed of rollers pressed against the driven portion may be identical for each conveying unit. As a result, the driven portion unprecisely mounted does not receive any excessive horizontal force, resulting in smooth conveyance of the cart.

An alternative solution is obtained by controlling the rotating speed of each drive motor for conveying all the carts at an identical speed.

These two improvements will facilitate the easy extension work of a production line.

In the production line, the conveying direction may be changed in the midst of conveying pallets. For changing the conveying direction, a dedicated changing device is usually used in addition to the driving and braking conveying units. This is disadvantageous in terms of equipment costs.

The Japanese Unexamined Patent Publication No. 1-192610 discloses an apparatus for changing the direction of pallet conveyance by 180 degrees. In this apparatus, a plurality of shafts are linked for forming a semicircle to convey pallets along each shaft. However, the linkage of a plurality of shafts causes a restriction for minimizing the radius of curvature of the apparatus. Accordingly, the apparatus becomes unnecessarily large.

In a conveying apparatus, as described above, the preceding pallet is pushed by the following pallet, thereby conveying a plurality of pallets in sequence. Hence, when the conveying apparatus operates normally, the adjacent carts should be in contact one with another.

In view of this fact, various kinds of devices are proposed for checking the state of contact between adjacent carts. For instance, the device having a roller along in the conveying route may be in compressive contact with each cart. The rotation of the roller can be detected by an encoder so that the spacing between adjacent carts is calculated based on the detected value, thereby checking the state of contact between carts.

In another example, a device uses an optical non-contact sensor such as an asea sensor to directly detect the spacing between cartes for checking the state of contact between carts.

For the device using the encoder, if slippage occurs between the roller and a cart, the spacing may be calculated from an erroneous value detected by the encoder, and consequently, the checking accuracy deteriorates. Additionally, the need for calculating the spacing makes the control complex, leading to an increase in equipment costs. For the device using a non-contact sensor, foreign matter such as dirt and dust is apt to cause an error or malfunction; hence, this method is poor in reliability.

SUMMARY OF THE INVENTION

The present invention has been accomplished in view of the above-mentioned facts. It is a major object of the present invention to provide a conveying system for a production line which allows existing mechanisms to be utilized for reducing equipment costs.

It is another object of the present invention to provide a conveying system in which the size of the intersection of two conveyors having different conveying directions can be reduced even in the case where the conveying direction of objects to be conveyed (hereinafter simply referred to as "objects") is changed by a conveying unit.

It is a further object of the present invention to provide a conveying system capable of improving the reliability of a checking operation in which contact between objects is checked by a conveying unit.

It is still another object of the present invention to provide a conveying system which allows an object to smoothly travel along the conveying route by absorbing an excessive force imposed on the object by means of the swing of rollers even when there is an error in mounting a driven portion on the object.

It is a still further object of the present invention is to provide a conveying system which allows a production line to be easily extended.

It is a still further object of the present invention is to provide a conveying system which allows a preceding object to smoothly separate from a following object by moving the former faster than the latter.

It is a still further object of the present invention is to provide a conveying method/system for ensuring a sequential and smooth conveyance of the objects.

For realizing the above objects, a system according to the present invention has a plurality of conveyors arranged along a conveying route of the production line, each conveyor including a first conveying unit and a second conveying unit each conveying unit including a pair of rollers for clamping a prolonged driven portion formed with each object to convey the object by rotating the rollers in the opposite directions by a roller rotating mechanism, wherein the objects successively fed into the conveying route are brought into contact with each other by the action of the conveyor units to form a train of the objects. The system comprises first parallel rails and second parallel rails both extending in the different directions from each other and crossing each other at an intersection for forming said conveying route, a moveable section formed with at least a part of said driven portion and supported on said object for rotational movement, said moveable section being directionally aligned with one of the first conveying unit and the second conveying unit by which the object is conveyed, the first conveying unit being disposed between the first rails in the vicinity of the intersection, and the second conveyor being disposed between the second rails in the vicinity of the intersection, a first mechanism provided with the first conveying unit for advancing the rollers thereof to abut the driven portion of the object when the object on the first rails are closed to the intersection and for retracting the rollers from the driven portion of the object when the object comes to the intersection, a second mechanism, provided with the second conveying unit for advancing the rollers thereof toward the intersection when the object comes to the intersection and for advancing the rollers thereof away from the intersection when the rollers abut the driven portion of the object at the intersection, and a third mechanism, secured to the intersection, for rotating the moveable section from a position along the first rails to a position along the second rails for changing the conveying direction of the object without changing a posture of the object when the object is in the intersection.

In another aspect, a system of the present invention has a plurality of conveyor units arranged along a conveying route of the production line, and each conveying unit including a pair of rollers for clamping a prolonged driven portion formed with each object to convey the object by rotating the rollers in the opposite directions by a roller rotating mechanism, wherein the objects successively fed into the conveying route are brought into contact with each other by the action of the conveying unit units to form a train of the objects. The system has each conveying unit being disposed in a location where a preceding object is removed from a following object in the train, a mechanism, linked to the rollers of the conveying unit, for advancing said the rollers abutting against the driven portion of the following object toward the preceding object at a speed faster than a speed of conveyance obtained by rolling the rollers when the preceding object is removed from the following object, and for retracting the rollers when the following object comes in contact with the preceding object due to the advance movement, means for detecting the state of the rollers moving mechanism after the mechanism has operated for moving the rollers of the third conveyor, and means for determining that the following object has received a reaction force from the preceding object when the operation of the roller moving mechanism has brought the following object in contact with the preceding object.

In the third aspect of the present invention, the system has a plurality of conveying units arranged along a conveying route of the production line, and each conveying unit including a first roller and a second roller for clamping a prolonged driven portion formed with each object to convey the object by rotating the rollers in the opposite directions by a roller rotating mechanism, wherein the objects successively fed into the conveying route are brought into contact with each other by the action of the conveyor units to form a train of the objects. The system comprises said rollers being supported to be swung in a direction perpendicularly to the extending direction of the conveying route and along a plane of conveying route, while being forced to contact the driven portion of the object.

According to a method of conveying a plurality of objects in the system in which said objects successively fed to a production line having a plurality of conveying unit, each conveying unit having a pair of rollers for contacting a prolonged driven portion attached to each object and are rotated in the opposite directions by a roller rotating mechanism to advance each object, wherein the objects contacting each other. The method comprises the steps of determining a target conveying speed for each object, detecting an actual conveying speed of each object, and controlling the roller rotating mechanism of each conveyor to rotate at the target conveying speed.

According to a still further aspect of the present invention, the system has a plurality of conveying unit arranged along a conveying route of the production line, and each conveying unit including a first roller and a second roller for clamping a prolonged driven portion formed with each object to convey the object by rotating the rollers in the opposite directions by a roller rotating mechanism, wherein the objects successively fed into the conveying route are brought into contact with each other by the action of the conveying units to form a train of the objects. The system comprises means for determining a target conveying speed for each object, means for detecting an actual conveying speed of each object, and means for controlling the roller rotating mechanism of each conveyor to rotate at the target conveying speed.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 24 is a partial plan view showing the conveying unit shown in FIG. 20;

FIG. 30 is a schematic plan view of the conveyer from which pallets are removed and which shows the state immediately before a preceding pallet is separated from following pallets;

FIG. 31 is a schematic plan view of the conveyer showing the state immediately before the preceding pallet is separated from the following pallets;

FIG. 38 is a partially cutaway plan view of the conveyer from which pallets are removed and which shows the state in which downstream proximity sensors have detected the members to be detected on the pallets;

FIG. 39 is a schematic plan view of the conveyer showing the state in which the downstream proximity sensors have detected the detection members on the pallets;

DETAILED DESCRIPTION OF THE PREFERRED EMBODIMENTS

First Embodiment

A first embodiment in which a conveying system of the present invention is applied to an automobile assembly line will be described below with reference to FIGS. 1 to 19.

Figure 1:
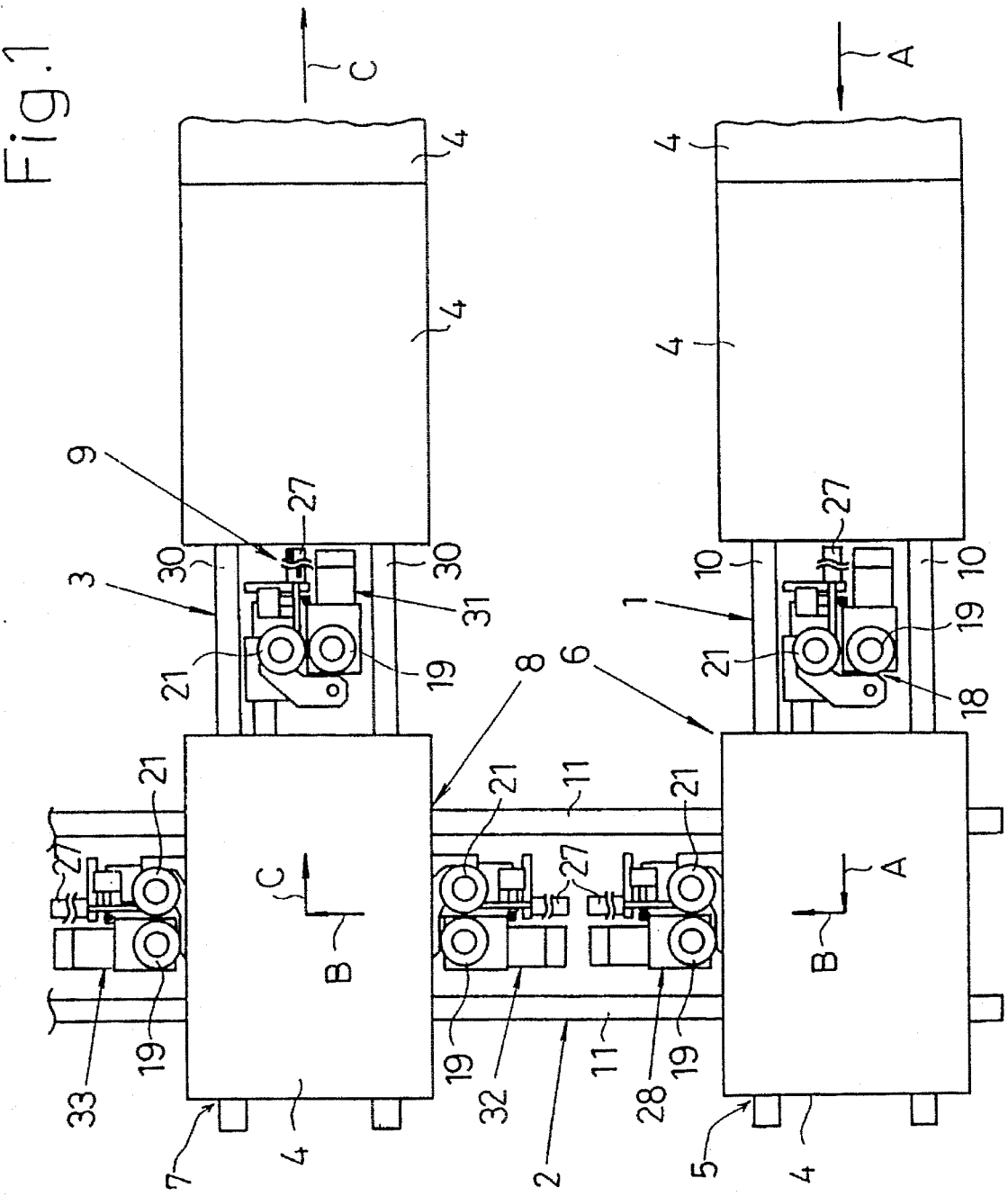
FIG. 1 is a schematic plan view showing locations for changing the direction of pallet conveyance in a production line according to a first embodiment of the present invention.

FIG. 1 shows an assembly line constructed by disposing a plurality of conveying units along a predetermined conveying route. In this assembly line, a plurality of pallets 4 are conveyed in contact with each other along the conveying route by the operation of each conveying unit. The conveying route comprises first rails 1, second rails 2 intersecting the first rails 1, and third rails 3 intersecting the second rails 2. The conveying direction B of the second rails 2 forms an angle of 90 degrees with the conveying direction A of the first rails 1, and also the conveying direction C of the third rails 3 forms an angle of 90 degrees with the conveying direction B. Each pallet 4 is conveyed on the first rails 1, the second rails 2 and the third rails 3 in this order.

A changing device 6 for changing the direction of conveying the pallet 4 is disposed at an intersection 5 of the first rails 1 and the second rails 2. Also, a changing device 8 for changing the direction of conveying the pallet 4 is disposed at an intersection 7 of the second rails 2 and the third rails 3. A checking device 9 for checking the state of contact between adjacent pallets 4 is disposed in the third rails 3 near an intersection 7.

First, the changing device 6 for changing the conveying direction will be described in detail with reference to FIGS. 1 to 10.

Figure 2:
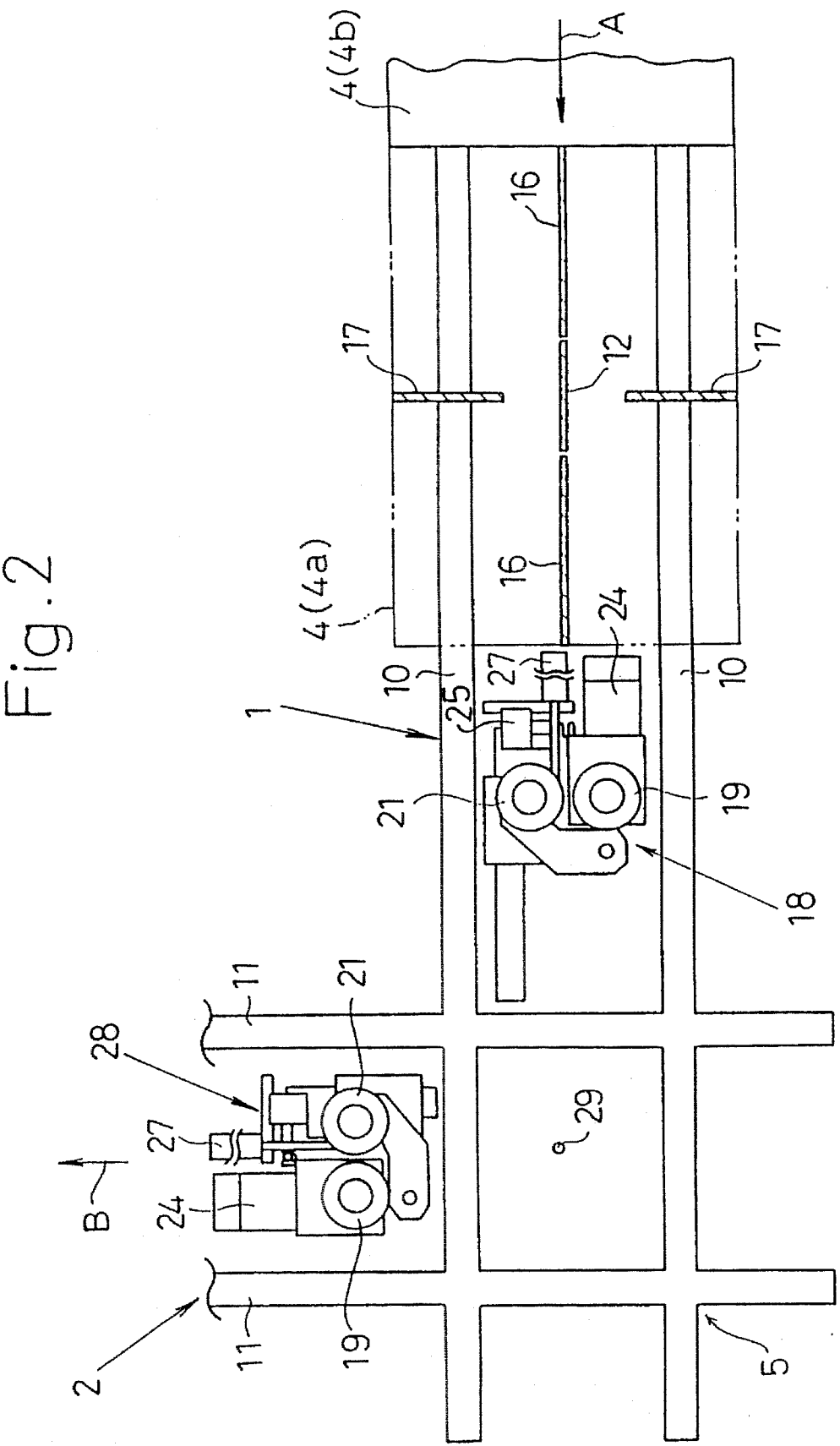
FIG. 2 is an illustration showing the state immediately before a pallet is conveyed to the intersection of a first conveyor and a second conveyor shown in FIG. 1.

As shown in FIG. 2, the first rails 1 include a pair of guide members 10 extending in parallel with each other in the horizontal direction. Likewise, the second rails 2 include a pair of guide members 11 extending in parallel with each other in the horizontal direction. Both guide members 11 intersect both guide members 10 at 90 degrees at the intersection 5. Each pallet 4 is conveyed along these guide members 10 and 11.

Figure 7:
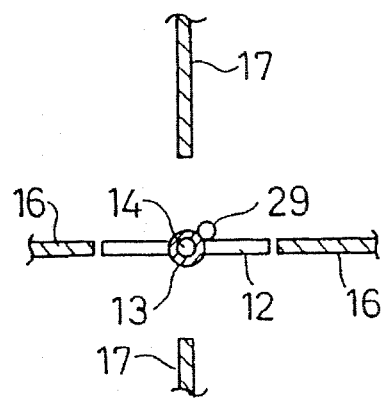
FIG. 7 is a partial plan view showing the state of a movable driven portion of the pallet shown in FIG. 6.
Figure 8:
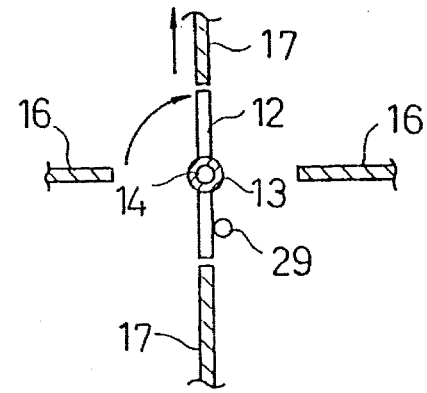
FIG. 8 is a partial plan view showing the state that a movable driven portion has come in contact with a post and rotated from the position shown in FIG. 7.

As shown in FIGS. 7 and 8, a plate-like movable driven portion 12 is attached to each pallet 4. In detail, a tubular supporting member 13 is attached to the underside of each pallet at the central portion thereof. A support shaft 14 is fixed to the movable driven portion 12. This support shaft 14 is fit in the bushing 13. Each movable driven portion 12 rotates about the support shaft 14.

On the underside of the pallet 4, a pair of stationary driven portions 16 are disposed outside the pivoting space of the movable driven portion 12 and extends between both edges of the pallet 4 on a line passing through the center of the support shaft 14 along the conveying direction A. When the movable driven portion 12 stops on the line, the movable and stationary driven portions 12 and 16 align with each other. Likewise, on the underside of the pallet 4, a pair of stationary driven portions 17 extend between both edges of the pallet 4 and are located on a line passing through the center of the support shaft 14 along the conveying direction B. When the movable driven portion 12 stops on the line, the movable and stationary driven portions 12 and 17 align each other.

Figure 9:
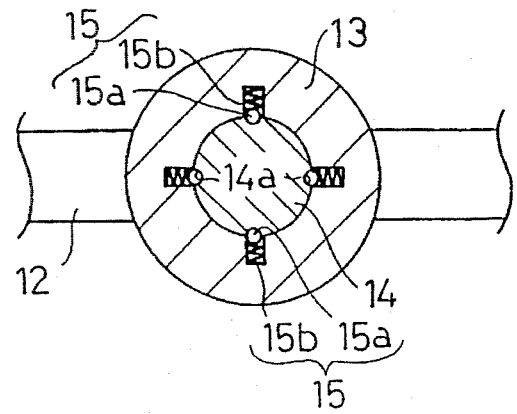
FIG. 9 is a partially enlarged sectional view showing the shaft support member and the support shaft of the movable driven portion in FIG. 7.

As shown in FIG. 9, a plurality of rotation restricting mechanisms 15 are disposed between each bushing 13 and each support shaft 14 at constant angular intervals (90° in the example shown in the figure). Each mechanism 15 comprises balls 15a and springs 15b urging the balls 15a toward the center of the support shaft 14. When the movable driven portion 12 aligns with both stationary driven portions 16 or 17 as a result of the pivoting of the support shaft 14, the balls 15a fit in recesses 14a in the periphery of the support shaft 14. This fitting engagement causes the movable driven portion 12 to securely stop its rotational movement.

Figure 3:
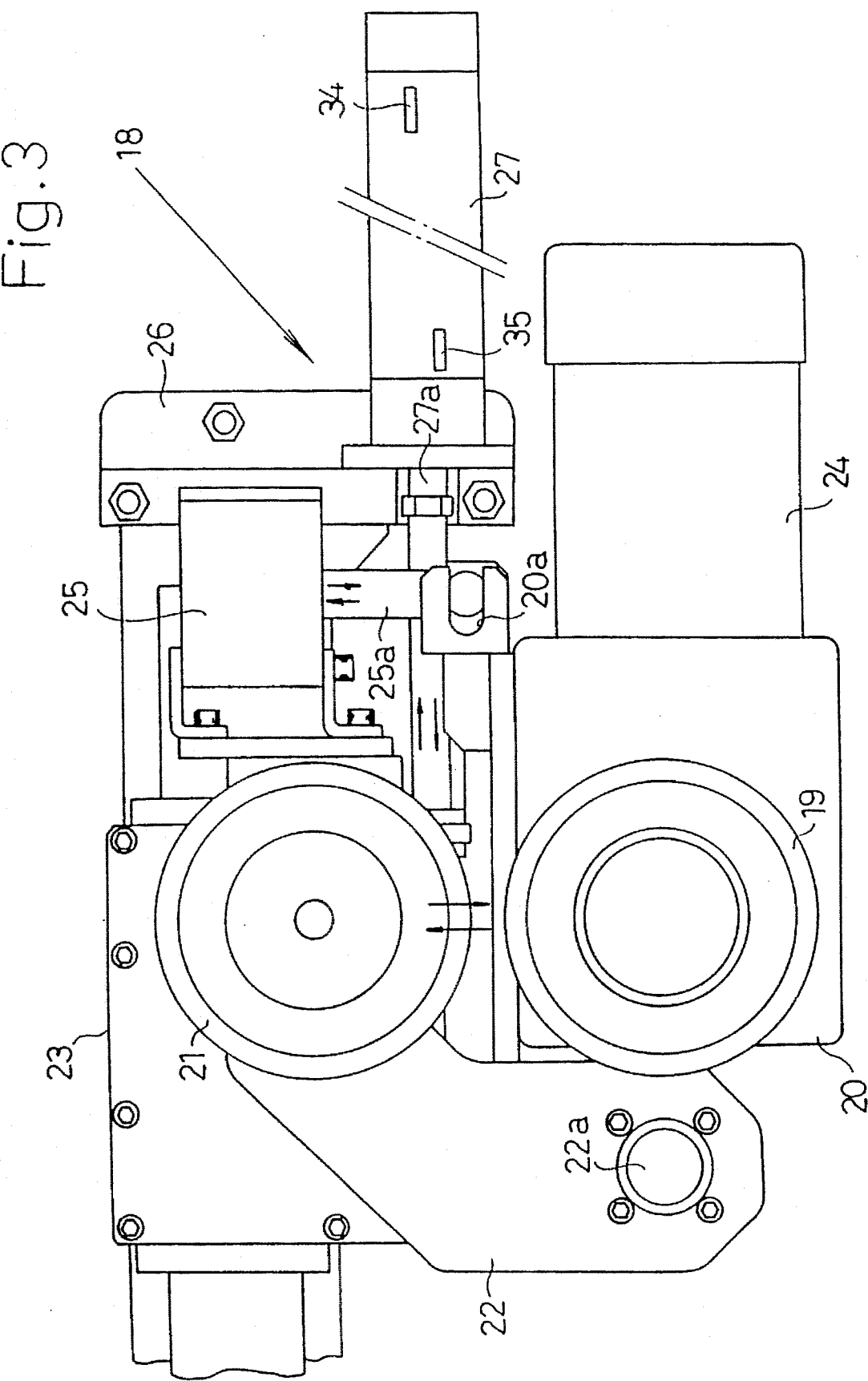
FIG. 3 is a schematic plan view showing a conveying unit for changing the conveying direction shown in FIG. 2.

A conveying unit 18 is disposed in the first rails 1 near the intersection 5. As shown in FIG. 3, the conveying unit 18 has a pair of supporting plates 20 and 23. The supporting plates 20 and 23 are connected each other and supported on both guide members 10 for reciprocative movement.

A drive roller 19 and a drive motor 24 for rotating the drive roller 19 are mounted on the supporting plate 20. A support shaft 22a is mounted on the supporting plate 23 for pivotably supporting the base end of a swing member 22. A follower roller 21 is rotatably mounted at the forward end portion of the swing member 22. An air cylinder 25 is mounted at the forward end portion of the swing member 22 for pressing the follower roller. A piston rod 25a of the air cylinder 25 extends substantially perpendicularly to the conveying direction A, and its forward end is fit in a U-shaped linking groove 20a of the supporting plate 20.

When the piston rod 25a projects from the air cylinder 25 to cause the swing member 22 to rotate about the support shaft 22a in the counterclockwise direction as viewed in FIG. 3, the follower roller 21 moves away from the drive roller 19. On the contrary, when the piston rod 25a retracts into the air cylinder to cause the swing member 22 to rotate about the support shaft 22a in the clockwise direction as viewed in FIG. 3, the follower roller 21 approaches the drive roller 19. In the conveying unit 18, the rollers 19 and 21 are pressed against both sides of the driven portions 12, 16 and 17 of the pallet 4 and rotated in mutually opposite directions for applying an advancing force to the pallet 4 in the conveying direction A.

A bracket 26 is disposed on the guide rail 10 in an unmovable fashion, and an air cylinder 27 is mounted on the bracket 26 for moving the rollers. A piston rod 27a of the air cylinder 27 extends in the conveying direction A and is linked at its forward end with the supporting plate 23. As the piston rod 27a moves, both supporting plates 20 and 23, both rollers 19 and 21, the swing member 22, the drive motor 24 and the air cylinder 25 reciprocate as a unit along the conveying route.

In the second rails 2, a conveying unit 28 is disposed near the intersection 5. Since the conveying unit 28 has the same structure as the conveying unit 18, the detailed description thereof is omitted.

A mechanism for changing the conveying direction is disposed in the intersection 5. This mechanism includes a post 29 in the intersection 5. When the pallet 4 is to be conveyed from the intersection 5 to the second rails 2, the post 29 comes in contact with the movable driven portion 12 and causes the movable driven portion 12 to rotate, in cooperation with an advancing force applied by the conveying unit 28 toward the second rails 2. This rotational movement causes the movable driven portion 12 to turn from the extending direction of the first rails 1 to the extending direction of the second rails 2.

FIG. 2 shows the state in which a plurality of pallets 4 are conveyed on the first rails 1. In this figure, for distinguishing pallets 4 from each other, a preceding pallet is represented with 4a and a following pallet is represented with 4b. FIG. 2 shows the state in which both pallets 4a and 4b are in contact with each other and the following pallet 4b pushes the preceding pallet 4a for conveyance toward the intersection 5. The movable driven portion 12 of each of pallets 4a and 4b is aligned with the stationary driven portions 16.

In the conveying unit 18, the piston rod 27a is retracted in the air cylinder 27 and hence, both rollers 19 and 21 are far away from the intersection 5 (i.e. in a retracted positions). Also, the piston rod 25a is projected from the air cylinder 25 and hence, the follower roller 21 is away from the drive roller 19 and is not rotating. The conveying unit 28 is also in similar state to that of the conveying unit 18.

Figure 4:
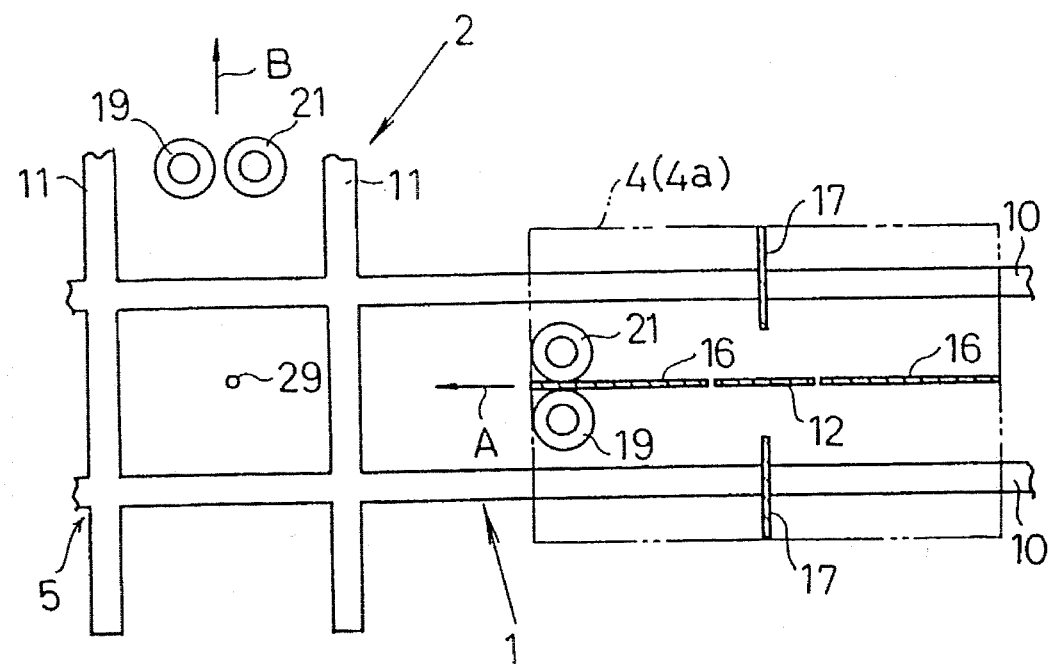
FIG. 4 is an illustration showing the state that a pallet which was located at the position shown in FIG. 2 approaches the intersection and is about to be sent to the intersection by the conveying unit of the first conveyor.

As shown in FIG. 4, when the pallets 4a and 4b approach the intersection 5 further from the positions shown in FIG. 2, the stationary driven portion 16 of the preceding pallet 4a is inserted between both rollers 19 and 21. The piston rod 25a is retracted into the air cylinder 25 to cause both the drive roller 19 and the follower roller 21 to be pressed against the stationary driven portion 16. When the drive roller 19 is rotated by the drive motor 24, the rotation is transmitted to the follower roller 21 via the stationary driven portion 16. This transmission of rotation causes the follower roller 21 to rotate in the opposite direction to the drive roller 19, thereby applying an advancing force to the stationary driven portion 16 in the conveying direction A. As a result, the pallet 4a is conveyed toward the intersection 5. At this time, the conveying speed of the preceding pallet 4a is faster than that of the following pallet 4b, causing the pallet 4a to gradually move away from the pallet 4b.

Figure 5:
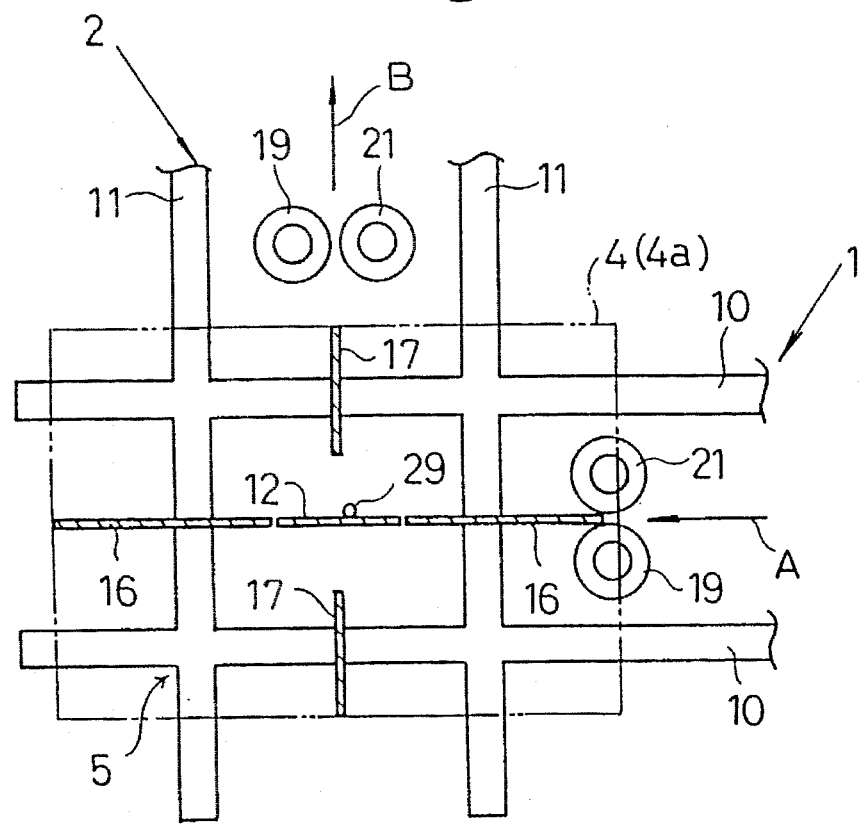
FIG. 5 is an illustration showing the state that a pallet has been sent from the position shown in FIG. 4 to the intersection.

Synchronously with the above action, the piston rod 27a projects from the air cylinder 27 to cause the drive roller 19 and the follower roller 21 to approach (advance toward) the intersection. This approach causes the conveying speed of the preceding pallet 4a to further accelerate. Finally, the pallet 4a is conveyed onto the intersection 5 as shown in FIG. 5.

Figure 6:
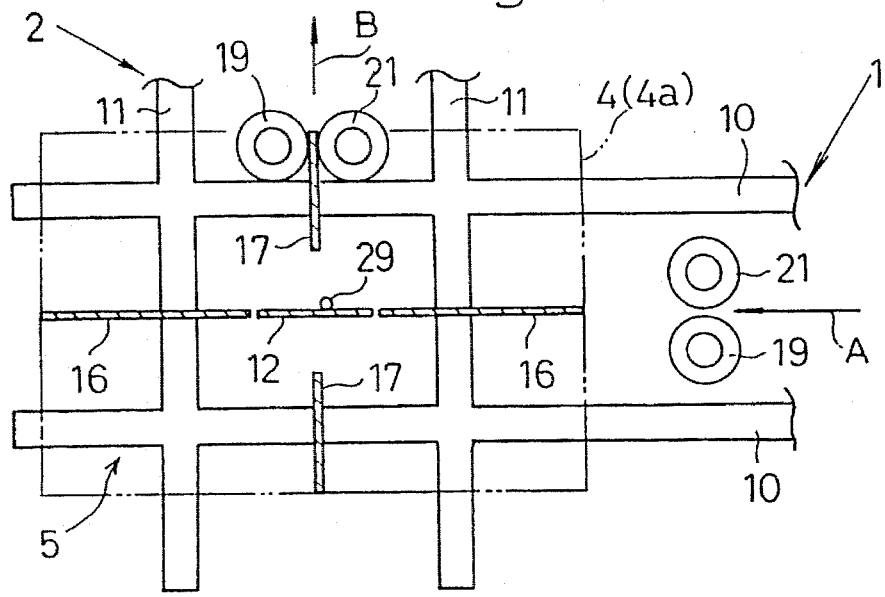
FIG. 6 is an illustration showing the state immediately before a pallet is sent out by the conveying unit of the second conveyor subsequently to the state in FIG. 5.

Next, as shown in FIG. 6, the piston rod 25a projects from the air cylinder 25 to cause the follower roller 21 to move away from the drive roller 19. The drive motor 24 stops driving the drive roller. The piston rod 27a is retracted into its air cylinder to cause both rollers 19 and 21 to move away (retract) from the intersection 5 and hence, the rollers leave the stationary driven portion 16 of the preceding pallet 4a.

At the same time, the drive roller 19 and the follower roller 21 approach the intersection 5, both rollers 19 and 21 are pressed against the stationary driven portion 17 of the preceding pallet 4a, and then the drive roller 19 is rotated. Accordingly, the stationary driven portion 17 of the preceding pallet 4a is conveyed in the conveying direction B. At this time, the movable driven portion 12 aligned with both stationary driven portions 16 comes in contact with the post 29 as shown in FIGS. 7 and 8. As the pallet 4a is conveyed in the conveying direction B, the movable driven portion 12 rotate. This rotational movement or pivoting motion stops when the movable driven portion 12 aligns with both stationary driven portions 17. Accordingly, the stationary driven portion 17, the movable driven portion 12 and the stationary driven portion 17 are fed between both rollers 19 and 21 in this order.

Figure 10:
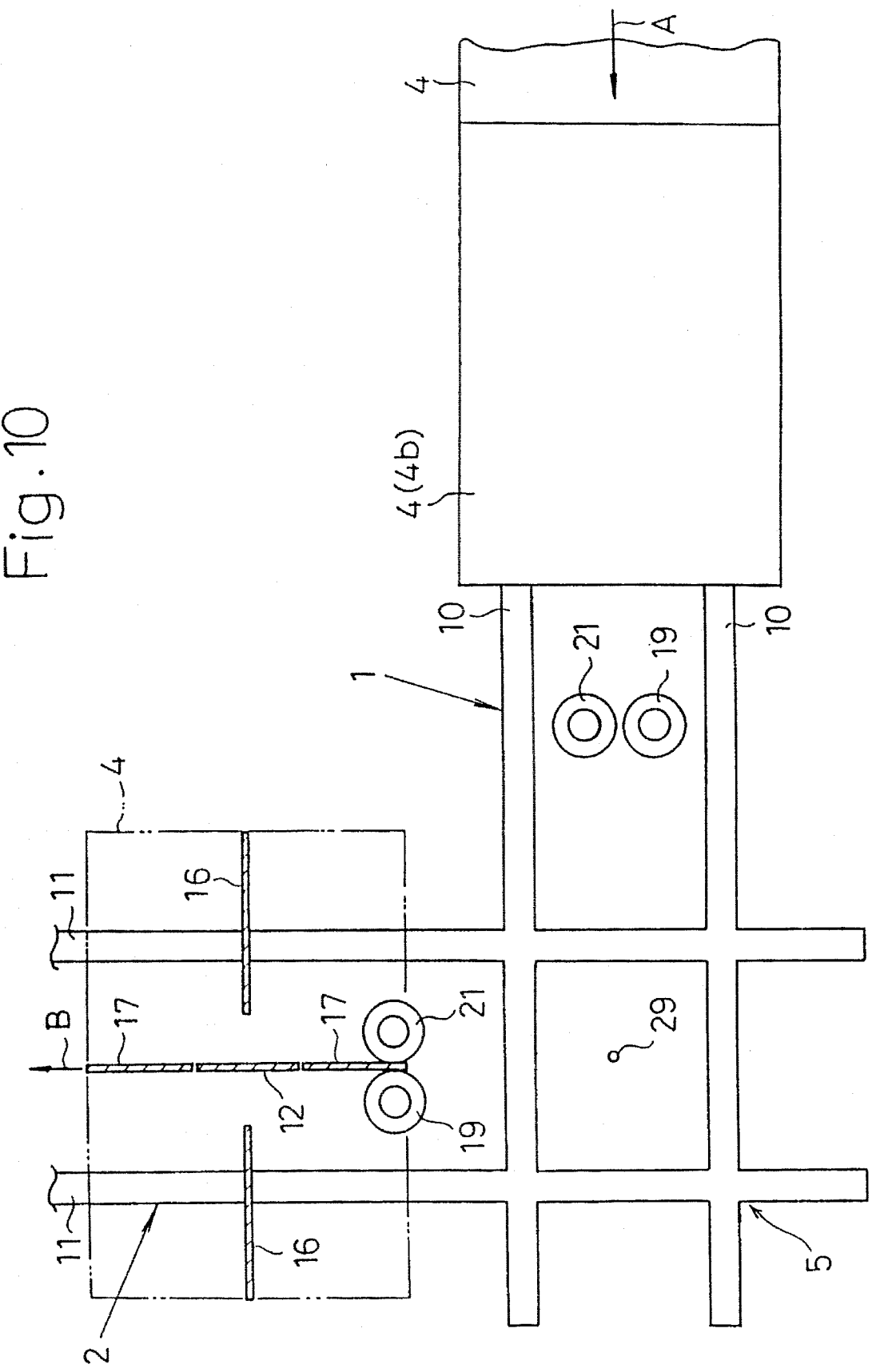
FIG. 10 is an illustration of actions showing the state that a pallet has been sent out by the conveying unit of the second conveyor subsequently to the state in FIG. 6.

Then, when the operation of the air cylinder 27 causes both rollers 19 and 21 to move away from the intersection 5, the preceding pallet 4a accelerates further for conveyance toward a next intersection 7 as shown in FIGS. 1 and 10.

Next, a changing device 8 disposed at the intersection 8 will be described with reference to FIGS. 1 and 11.

The third rails 3 comprises a pair of guide members 30 extending in parallel with each other in the horizontal direction. Both guide members 30 intersect both guide members 11 of the second rails 2 at right angles. Each pallet 4 is conveyed along these guide members 11 and 30. A conveying unit 31 is disposed in the third rails 3 near the intersection 7. A pair of conveying units 32 and 33 are disposed in the second rails 2 near the intersection 7 on both sides thereof. The structure of the conveying units 31, 32 and 33 is similar to that of the conveying unit 18.

As described above, when the pallet 4 conveyed on the first rails in the conveying direction A reaches the intersection 5, the conveying direction of the pallet 4 is changed 90° from A to B. The pallet 4 whose conveying direction has been changed, is conveyed by the second rails 2 in the conveying direction B. When the pallet 4 reaches the intersection 7, the conveying units 32 and 31 change the conveying direction of the pallet 4 90° from B to C.

During the time period when the conveying direction of the pallet 4 is changed at the intersection 7, the conveying unit 33 is stopped. If the conveying unit 31 is stopped and the conveying unit 33 is driven instead, the pallet 4 will continue its straight movement in the conveying direction B without changing its conveying direction at the intersection 7.

Next, a checking device 9 disposed in the third rails 3 for checking the state of contact between adjacent pallets 4 will be described in detail with reference to FIGS. 11 to 14.

A pair of reed switches 34 and 35 are mounted apart from each other on the air cylinder 27 of the conveying unit 31 in the conveying direction C. The reed switch 34 outputs an ON signal only when the piston rod 27a is retracted in the air cylinder to bring both rollers 19 and 21 far away from the intersection 7 as shown in FIG. 11; the reed switch outputs an OFF signal in other situations. On the other hand, the reed switch 35 outputs an ON signal only when the piston rod 27a projects from the air cylinder to bring both rollers 19 and 21 near the intersection 7 as shown in FIG. 12; the reed switch outputs an OFF signal in other situations.

In the third rails 3, a conveying unit 36 is disposed somewhat ahead of the conveying unit 31 in the conveying direction C. In distinction from the conveying unit 31, the air cylinder 27 and associated components are omitted from the conveying unit 36 because there is no need for it to move both rollers 19 and 21 thereof in the conveying direction C.

Figure 11:
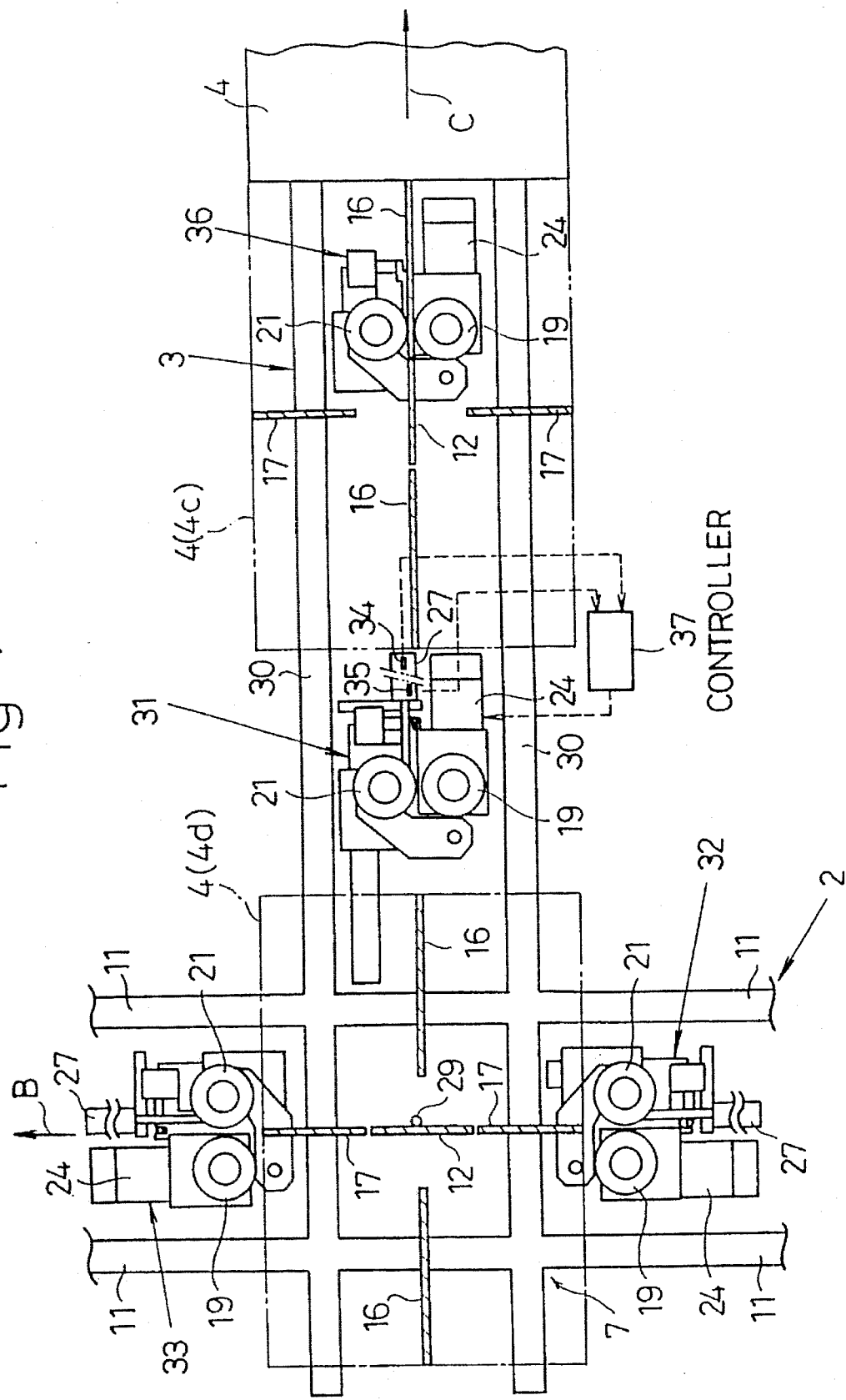
FIG. 11 is an illustration of actions showing the state that a pallet has been conveyed to the intersection of the second and third conveyors shown in FIG. 1 and is to be linked to a preceding pallet on the third conveyor.
Figure 12:
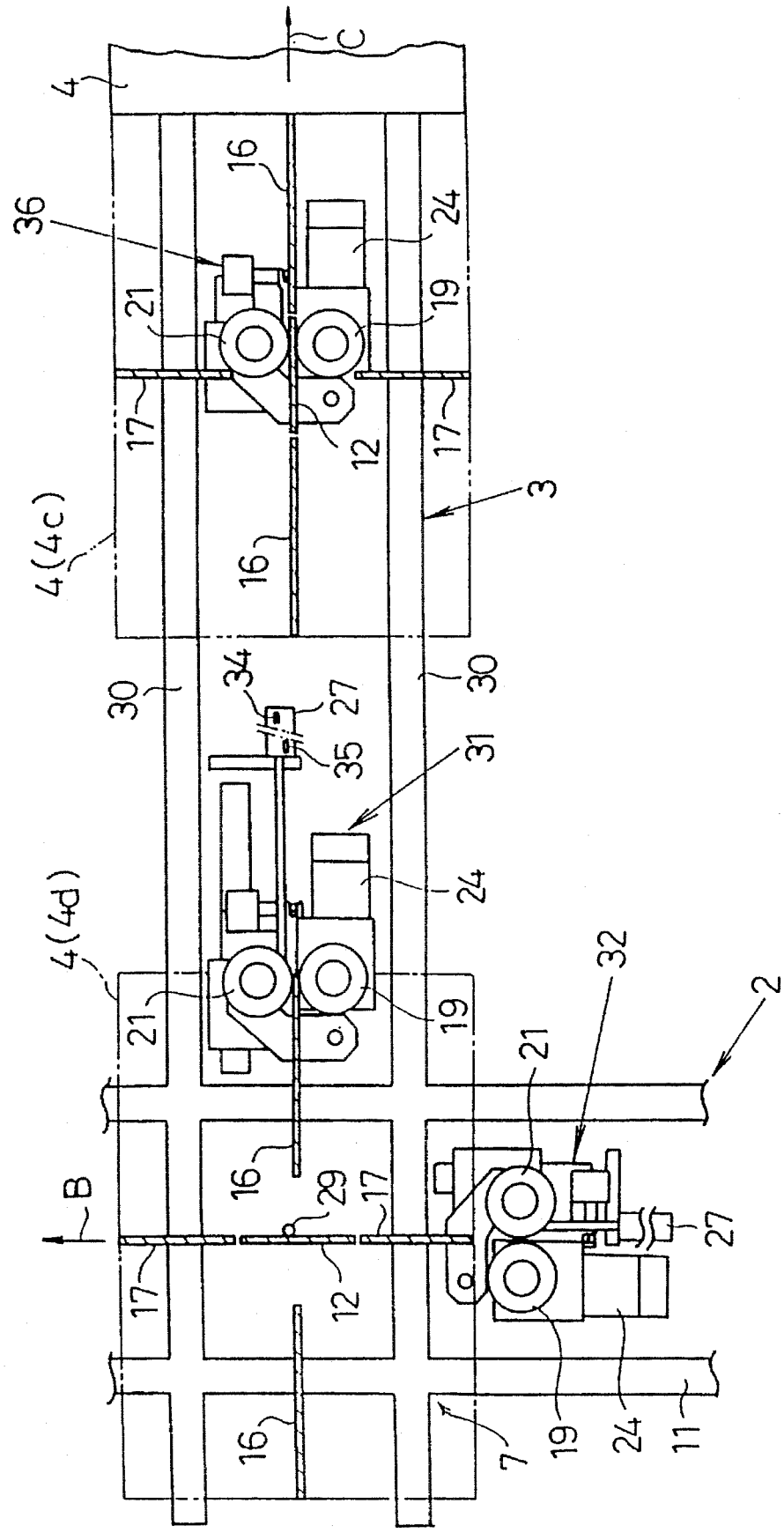
FIG. 12 is an illustration of actions showing the state immediately before a following pallet which was located at the position shown in FIG. 11 is sent out by the conveying unit of the third conveyor.

As shown in FIG. 11, both reed switches 34 and 35 and the drive motor 24 are connected to a controller 37. The controller 37 controls the rotation of the drive motor 24 based on an ON or OFF signal from both reed switches 34 and 35.

FIG. 11 shows the state in which the pallet 4d illustrated with a dash-and-dot line has been conveyed onto the intersection 7. In this state, both rollers 19 and 21 of the conveying unit 32 are near the intersection 7, and both rollers 19 and 21 of the conveying unit 31 are away from the intersection 7. The preceding pallet 4c illustrated with a dash-and-two-dot line is being conveyed by the conveying unit 36 in the conveying direction C. The preceding pallet 4c is positioned on both guide members 30 of the third rails 3 somewhat ahead of the pallet 4 on the intersection 7 in the conveying direction C. Moreover, another pallet 4 is in contact with the forward end of the pallet 4c and is conveyed. The preceding pallet 4c is pushing another pallet 4. As a result, pallet 4c and another pallet 4 are being conveyed at a constant conveying speed of $V_1$.

In this embodiment, the rotating speed of the drive roller 19 of the conveying unit 31 is set greater than that of the conveying unit 36. As shown in FIG. 12, the following pallet 4 on the intersection 7 is conveyed in the conveying direction C by the reciprocating motion of both rollers 19 and 21 of the conveying unit 31 as described above. The conveying speed $V_2$ effected by the conveying unit 31 is greater than the conveying speed $V_1$ effected by the conveying unit 36. As a result, the following pallet 4d gradually approaches the preceding pallet 4c.

Figure 13:
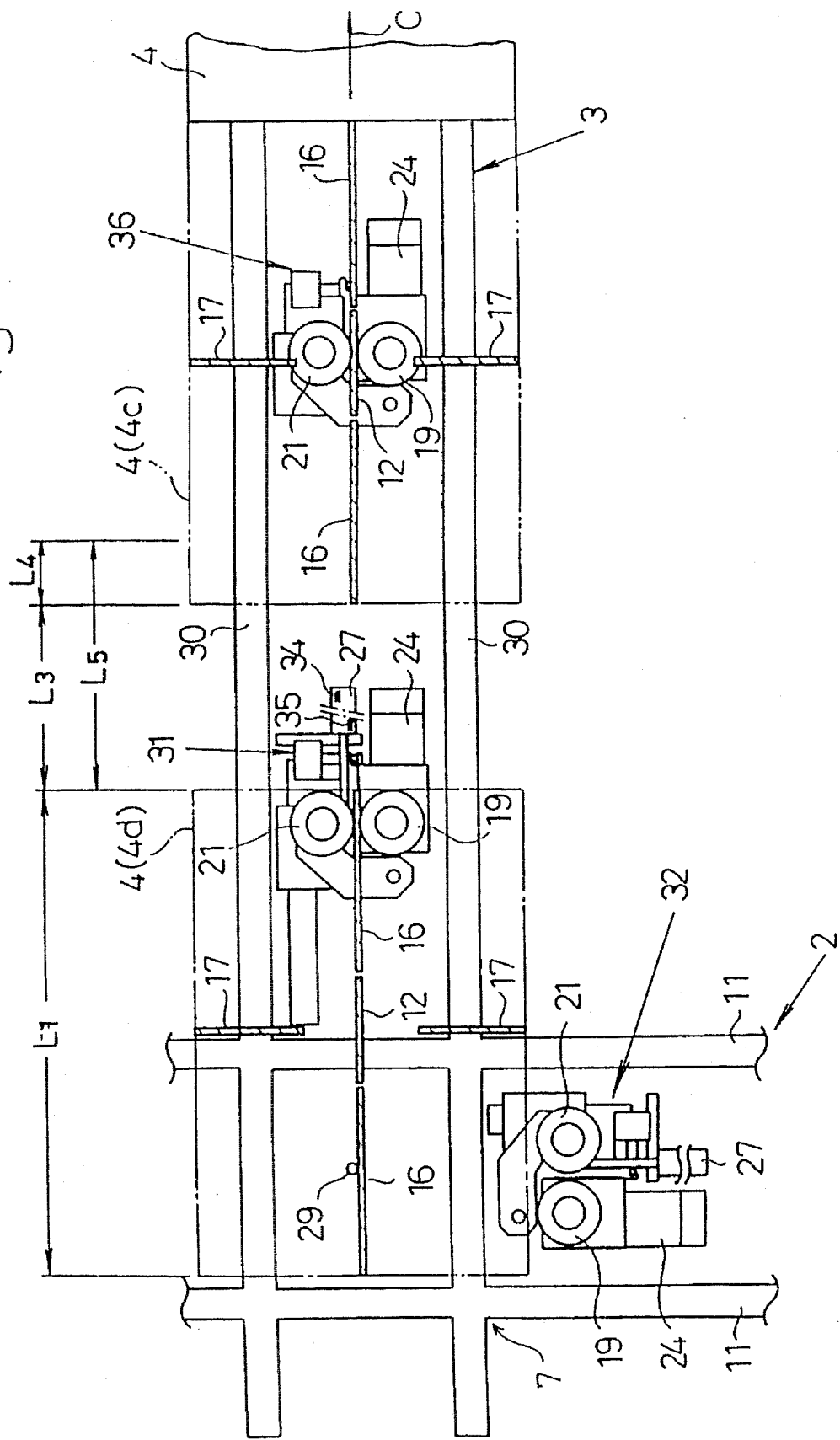
FIG. 13 is an illustration of actions showing the state that the following pallet located on the intersection as shown in FIG. 12 has been sent out by the conveying unit of the third conveyor and is about to come in contact with a preceding pallet on the third conveyor.
Figure 14:
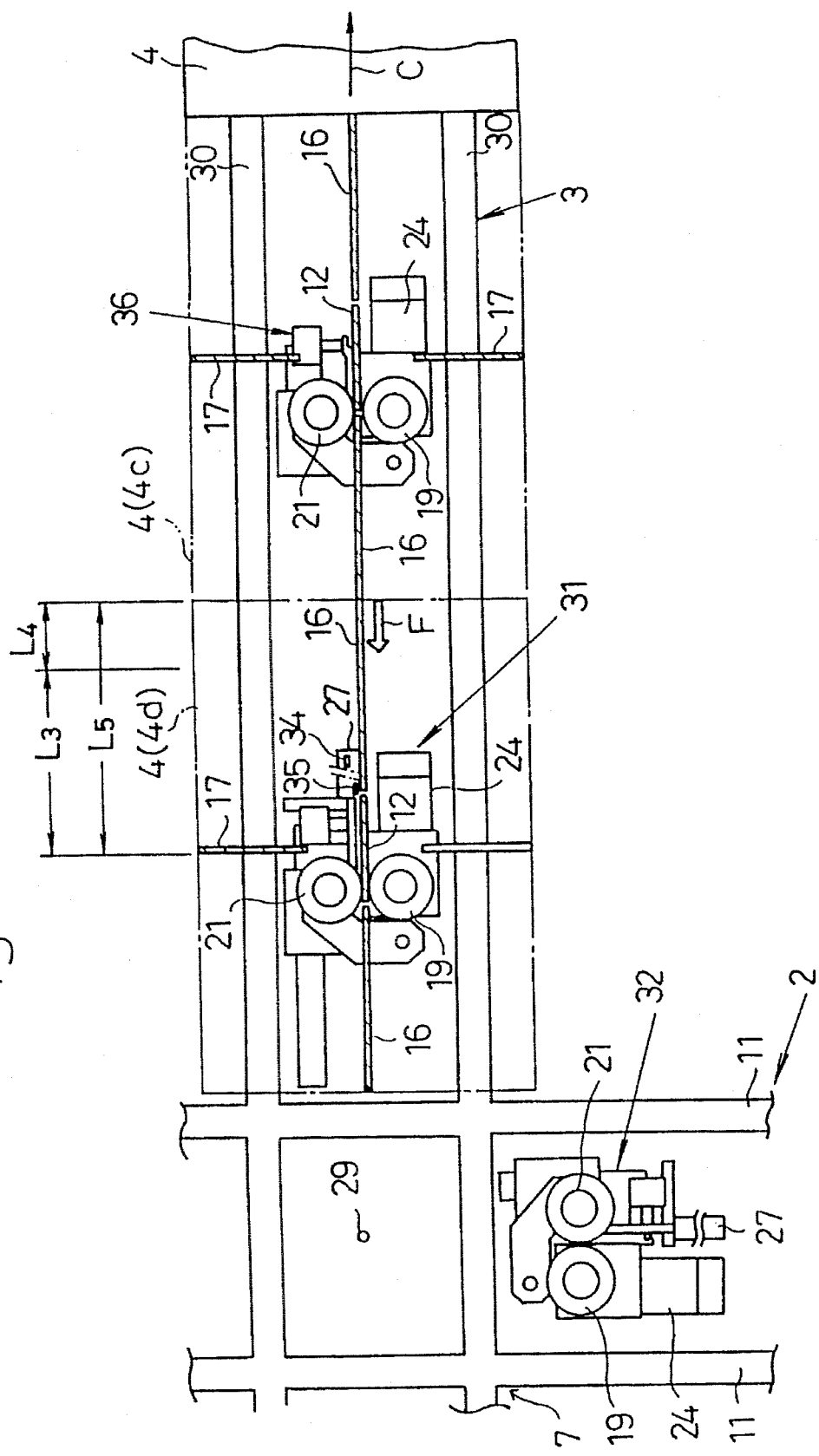
FIG. 14 is an illustration of actions showing the state that the following pallet which was located at the position shown in FIG. 13 has come in contact with the preceding pallet.

As shown in FIG. 13, the overall length of the driven portions 16 and 12 aligned in the conveying direction C is taken as $L_1$ for the following pallet 4d. The conveyable distance of the pallet 4d by the conveying unit 31 is taken as $L_2$. Then, $L_1 \geq L_2$ holds for the overall length $L_1$ and the distance $L_2$.

The distance between the following pallet 4d and the preceding pallet 4c is taken as $L_3$ when both rollers 19 and 21 of the conveying unit 31 have moved away from the intersection 7 in the conveying direction C. At this time, the reed switch 34 outputs an ON signal, and the reed switch 35 outputs an OFF signal.

Suppose that after T seconds from this state, the following pallet 4d is brought in contact with the preceding pallet 4c. The preceding pallet 4c moves over a distance $L_4$ ($=V_1 \times T$) and the following pallet 4d moves over a distance $L_5$ ($=V_2 \times T$) until this contact is made. As mentioned above, the maximum distance of quick feed is $L_3$. Accordingly, if the following pallet 4d is conveyed at the conveying speed $V_2$ so as to satisfy the expression (1) below, the pallet 4d will come in contact with the preceding pallet 4c in T seconds.

$$L_2 > L_5 \geq (L_4 + L_3) \qquad (1)$$

where with $L_5 = (L_3 + L_4)$, the following pallet 4d comes in contact with the preceding pallet 4c, and the clearance between both pallets 4c and 4d becomes zero.

Even when the clearance becomes zero, the following pallet 4d is still conveyed at the conveying speed $V_2$, and hence, the following pallet 4d imposes a pushing force on the preceding pallet 4c in the conveying direction C. On the other hand, a plurality of pallets 4 including the preceding pallet 4c are conveyed in contact with each other at the constant conveying speed $V_1$ by both rollers 19 and 21 of the conveying unit 36. Hence, the conveying speed $V_2$ of the following pallet 4d decreases and then becomes equal to the conveying speed $V_1$ of the preceding pallet 4c.

Accordingly, after the following pallet 4d has come in contact with the preceding pallet 4c, pallets 4 including both pallets 4c and 4d on the third rails are conveyed at the constant conveying speed $V_1$.

In actuality, however, since the drive roller 19 of the conveying unit 31 is still rotating, the pushing force imposed on the preceding pallet 4c by the following pallet 4d acts in reverse on the following pallet 4d as a reaction force F. Due to this reaction force F, the piston rod 27a of the air cylinder 27 is drawn in the opposite direction with respect to the conveying direction C, together with the rollers 19 and 21 and associated components. In response to this movement, the output signal of the reed switch 34 changes from ON to OFF.

The controller 37 in FIG. 11 judges based on the OFF signal from the reed switch 34 that the following pallet 4d has come in contact with the preceding pallet 4c. Then, the controller 37 controls the drive motor 24 of the conveying unit 31 to reduce the rotating speed of the drive roller 19. Accordingly, the rotation speed becomes equal to that of the drive roller 19 of the conveying unit 36. This adjustment (reduction) of the rotating speed is completed before the output signal of the reed switch 35 goes ON.

Then, the following pallet 4d passes the conveying unit 31. When the next pallet 4 reaches the intersection 7 as in the case shown in FIG. 11, the conveying unit 31 conveys the pallet 4 at the conveying speed $V_2$ in the conveying direction C in the same manner as described above.

In these devices 6, 8 and 9, the basic structure of the conventional conveying unit 36 is utilized, and novel structures are added to the conveying unit 36 according to the purpose of each of the devices 6, 8 and 9.

For all the devices 6, 8 and 9, the conveying units 18, 28, 31 and 32 are equipped with the air cylinder 27, and the air cylinder 27 functions to reciprocate the drive roller 19 and the follower roller 21 in the conveying direction A, B or C. The mechanism for reciprocating both rollers 19 and 21 is novel and provides functions for achieving the purpose of each of the devices 6, 8 and 9.

To describe in detail, for both devices 6 and 8, when the pallet 4 is conveyed to the intersection 5 or 7 and when the pallet 4 is conveyed away from the intersection 5 or 7, the movement of the pallet 4 is supplemented by the movement of both rollers 19 and 21. Also, by moving away from the intersection 5 or 7, both rollers 19 and 21 are prevented from interfering with each of the movable driven portions 12, 16 and 17 while the pallet 4 is moving.

For the device 9, when the following pallet 4d comes in contact with the preceding pallet 4c, the reaction force F acting on the following pallet is checked based on the movement of both rollers 19 and 21. Also, for the device 9, the reed switches 34 and 35 are mounted on the air cylinder 27 for detecting the movement of both rollers 19 and 21.

Also, for both devices 6 and 8, the pallet 4 is provided with the stationary driven portions 16 and 17 oriented in the conveying direction A, B or C and the movable driven portion 12. The movable driven portion 12 rotates to align with the stationary driven portions 16 or 17.

As described above, by using the basic structure of the conventional conveying unit in common, the equipment costs can be reduced. Moreover, as a result of adding the novel structures to the basic structure of the conventional conveying unit, the devices 6 and 8 allow the pallet 4 to change its conveying direction among A, B and C only through the rotational movement of the movable driven portion 12 at the intersections 5 and 7. According to the present embodiment, the mechanism for changing the conveying direction can be made smaller as compared with the prior art in which a pallet follows a circular path for changing its conveying direction. Also, since the device 9 detects the reaction force F generated by the mutual contact between pallets 4 as described above, the reliability of the operation for checking pallet-to-pallet contact can be increased as compared with the prior art using an encoder or a non-contact sensor.

According to the conventional practice, an air accumulating tank is mounted on the pallet 4 of this kind for driving various actuators on the pallet. Since an air source located away from the pallet 4 is used for supplying air to the air accumulating tank, this work for supplying the air is quite troublesome.

Hence, if the conveyance of the pallet 4 is utilized for supplying air to the air accumulating tank 38 as shown in FIGS. 15 to 19, there will be no need for installing an air source away from the pallet 4. Also, the automatic supply of air will improve workability.

Figure 15:
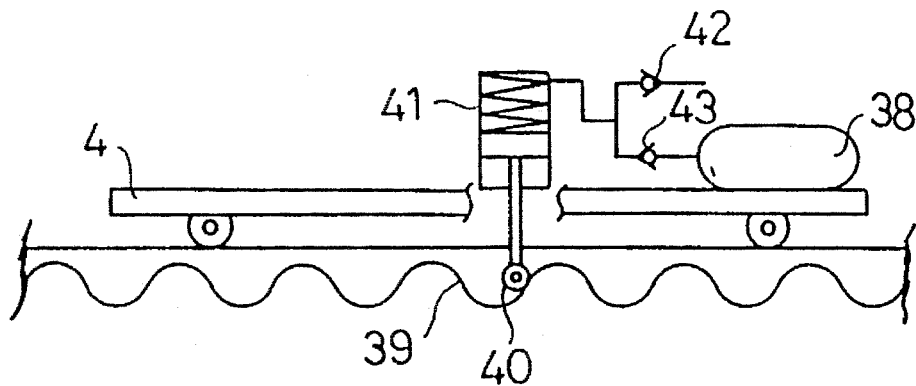
FIG. 15 is a diagram of principle showing an example of an air supply mechanism for an air accumulation tank disposed on a pallet.
Figure 16:
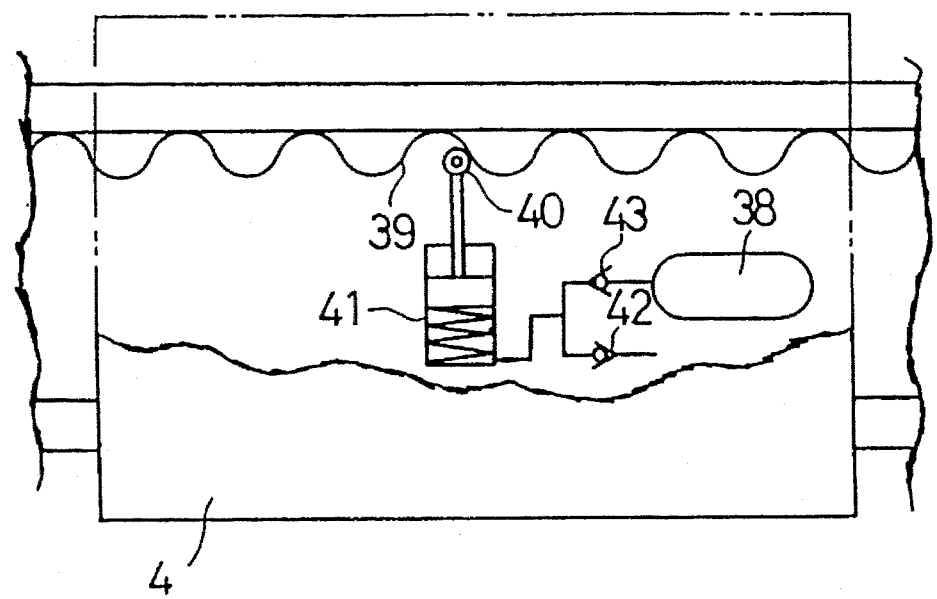
FIG. 16 is a diagram of principle showing another example of the mechanism shown in FIG. 15.
Figure 17:
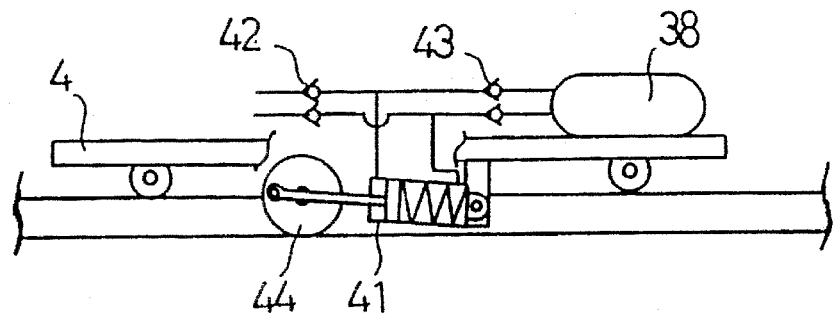
FIG. 17 is a diagram of principle showing a further example of the mechanism shown in FIG. 15.
Figure 18:
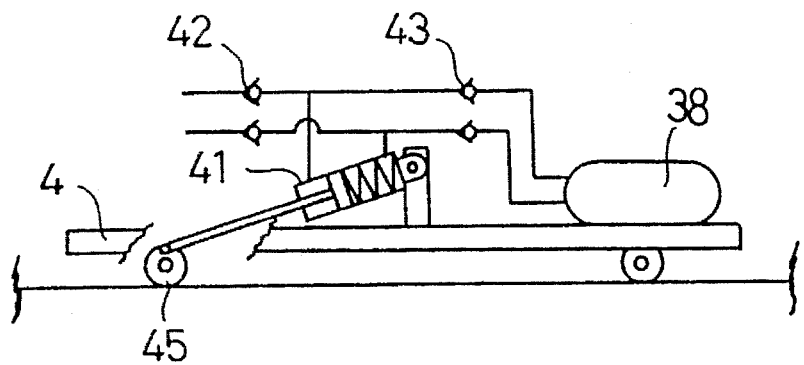
FIG. 18 is a diagram of principle showing still another example of the mechanism shown in FIG. 15.
Figure 19:
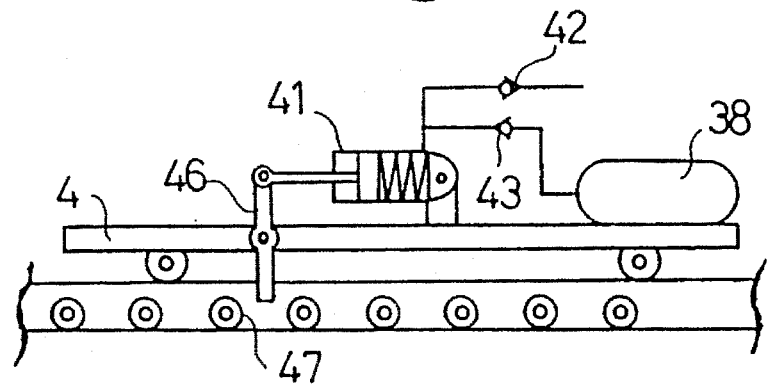
FIG. 19 is a diagram of principle showing a still further example of the mechanism shown in FIG. 15.

In an example shown in FIG. 15, as the pallet 4 is conveyed, a cam follower 40 reciprocates in the vertical direction, following a cam surface 39. The reciprocating motion operates the air cylinder 41 for supplying air to the air accumulating tank 38 via check valves 42 and 43. In FIG. 16, the location of the cam surface 39 is changed from FIG. 15. In FIG. 17, a disk 44 rotates as the pallet 4 is conveyed. This rotation causes an air cylinder 41 to operate through a slider-crank mechanism, and the operation of the air cylinder effects the supply of air to the air accumulating tank 38 via check valves 42 and 43. In FIG. 18, a wheel 45 of the pallet 4 is utilized in place of the disk 44 in FIG. 17. In FIG. 19, a lever 46 on the pallet comes in contact with a plurality of rollers 47 in sequence and to be tilted as the pallet 4 is conveyed, the tilting motion causes the air cylinder 41 to operate, thereby supplying air to the air accumulating tank 38 via check valves 42 and 43.

Second Embodiment

A second embodiment of the present invention will be described below with reference to FIGS. 20 to 35.

Figure 20:
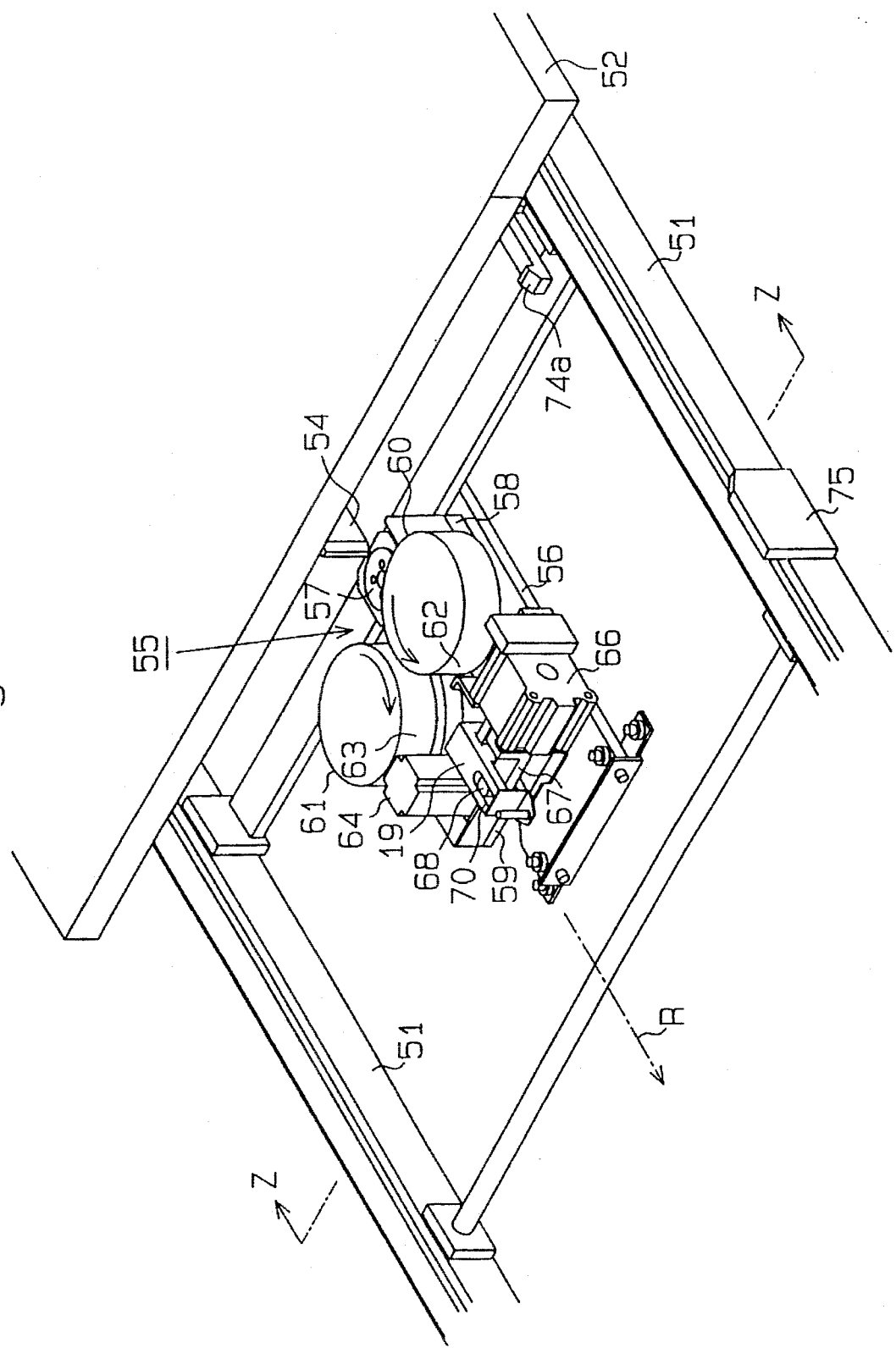
FIG. 20 is a schematic perspective view showing guide rails, a pallet and a conveying unit in a production line according to a second embodiment of the present invention.
Figure 21:
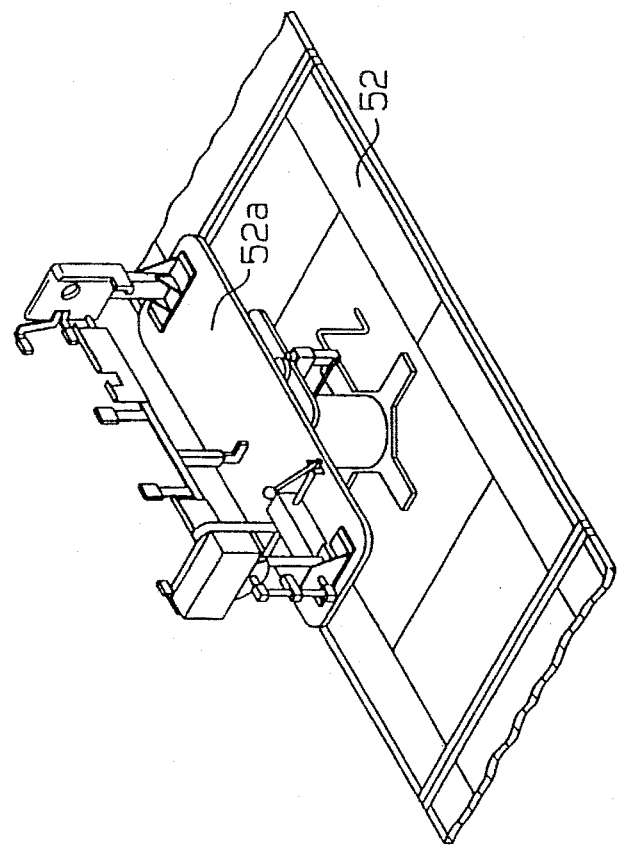
FIG. 21 is a partial perspective view showing a work support on the pallet shown in FIG. 20.
Figure 27:
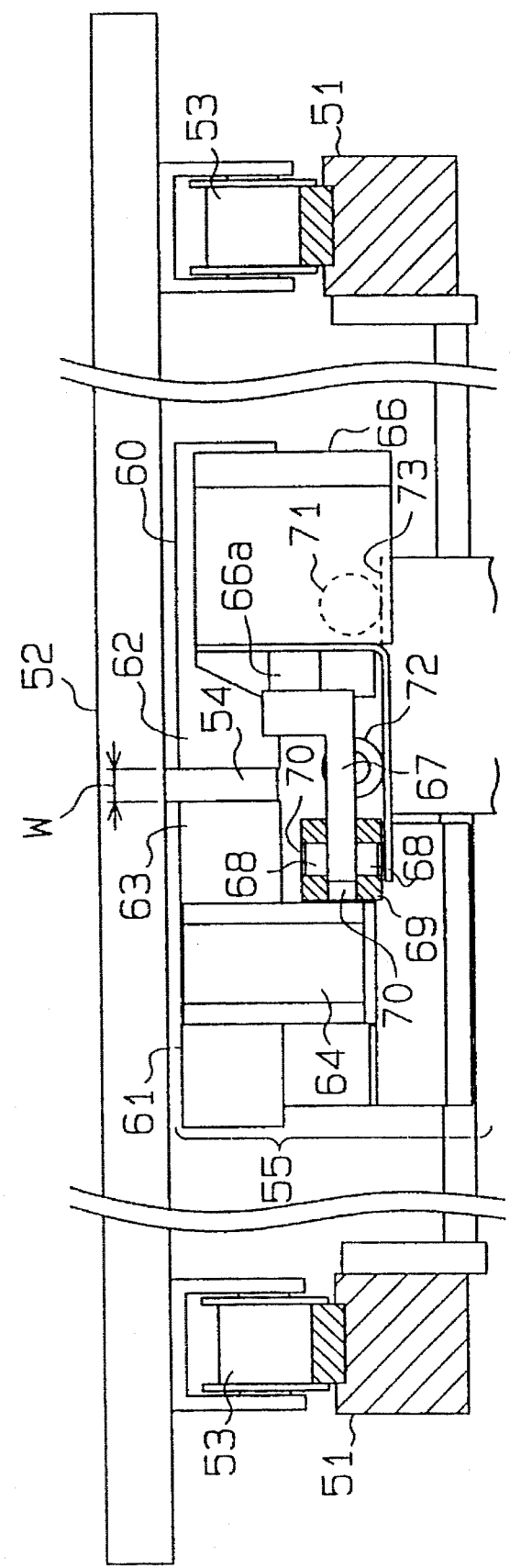
FIG. 27 is a partially cutaway front view of the conveying unit, pallet and others taken along line Z—Z in FIG. 20.

As shown in FIG. 20, an automobile assembly line (rails) comprises a pair of guide members 51 for forming extending along the conveying route R. A plurality of pallets are placed through wheels thereof on the guide members 51. As shown in FIG. 21, a supporting mechanism 52a is mounted on each pallet 52 for supporting a work. As shown in FIG. 27, a plate-like driven portion 54 having a predetermined width W and extending along the conveying route R is fixed on each pallet 52.

Figure 25:
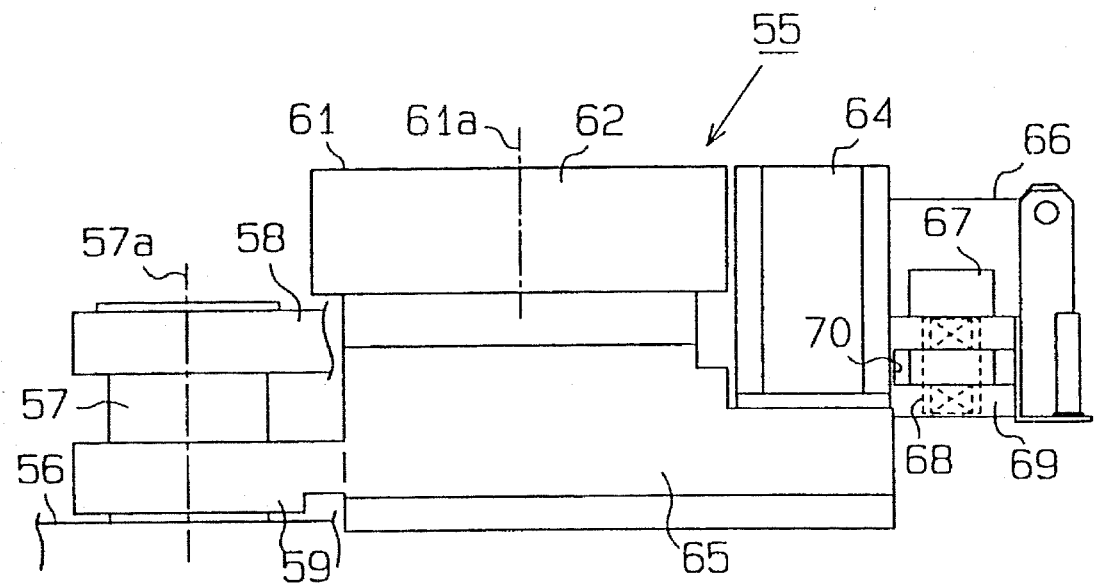
FIG. 25 is a partially cutaway-side view of the conveying unit taken along line X—X in FIG. 24.
Figure 26:
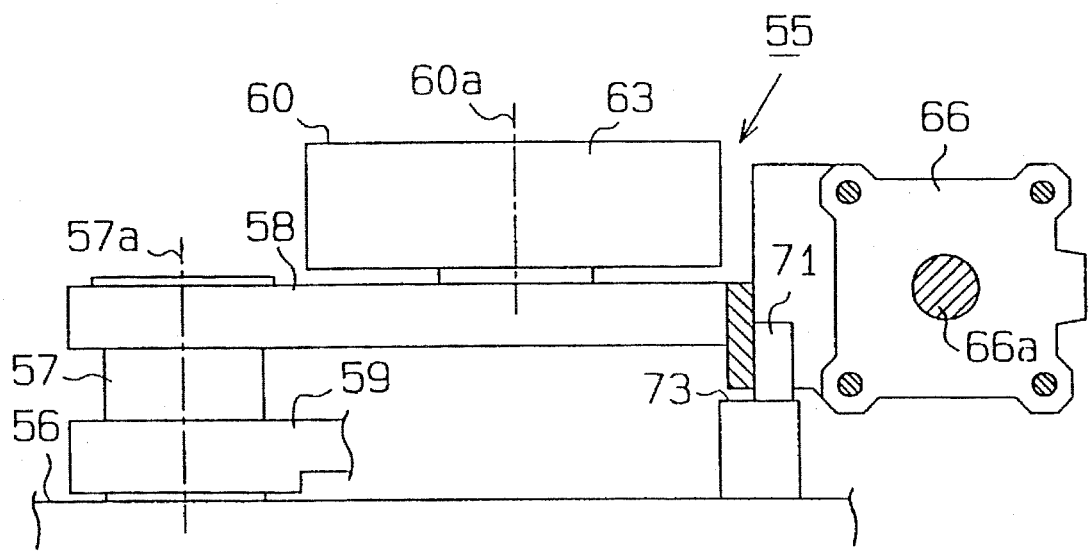
FIG. 26 is a partially cutaway side view of the conveying unit taken along line Y—Y in FIG. 24.

As shown in FIG. 30, a plurality of conveying units 55 are disposed at appropriate intervals between both guide members 51. As shown in FIGS. 20, 25 and 26, a base 56 is fixed between both guide members 51. A support shaft 57 is mounted upright on the base 56. A pair of swing members 58 and 59 are pivotably supported on the support shaft 57 at the base ends thereof. The swing members 58 and 59 are opposed to each other with respect to the path of movement of the driven portion 54 and extend in the conveying direction.

A disk-like drive roller 61 is rotatably supported on the swing member 59. A disk-like driven roller 60 of the same radius and height as those of the drive roller 61 are rotatably supported on the swing member 58. Axes 60a and 61a of the rollers 60 and 61 are in parallel with an axis 57a of the support shaft 57. The distance between the axes 57a and 60a is equal to the distance between the axes 57a and 61a. As shown in FIG. 27, peripheral surfaces 62 and 63 of the rollers 60 and 61 are opposed to each other with respect to the path of movement of the driven portion 54.

As shown in FIGS. 24–26, a drive motor 64 is mounted on the forward end portion of the swing member 59. A gear box 65 having a gear train, not shown, is located on the swing member 59 under the drive roller 61. The rotation of the drive motor 64 is transmitted to the drive roller 61 via the gear train in the gear box 65 for rotating the roller.

An air cylinder 66 having a piston rod 66a is mounted on the forward end portion of the swing member 58. An interlocking arm 67 is attached to the piston rod 66a and extends onto the swing member 59 across the path of movement of the driven portion 54. An interlocking pin 68 extending in the vertical direction is fit into the forward end portion of the interlocking arm 67.

An interlocking portion 69 is located on the swing member 59 in correspondence with the interlocking pin 68. A slot 70 is formed in the interlocking portion 69, passing through the top and bottom faces and side faces thereof and extending along the conveying route R. The interlocking arm 67 is inserted into the slot 70 passing through both side faces of the interlocking portion, and the interlocking pin 68 is inserted into the slot 70 passing through the top and bottom faces of the interlocking portion. Accordingly, when a force generated by the operation of the piston rod 66a is applied to the interlocking portion 69 via the interlocking arm 67 and the interlocking pin 68, both swing members 58 and 59, together with the air cylinder 66, the drive motor 64 and both rollers 60 and 61, pivot about the support shaft 57. As a result, the peripheral surfaces 62 and 63 of both rollers 0 and 61 move away from or approach the path of movement of the driven portion 54 over an identical distance. As both swing members 58 and 59 pivot, the interlocking pin 68 moves along the slot 70. Supporting rollers 71 and 72 are mounted ahead of both rollers 60 and 61 of both swing members 58 and 59 in the conveying direction. The supporting rollers 71 and 72 are on the supporting surface 73 on the base 56 as shown in FIGS. 26 and 27. Accordingly, as the swing members 58 and 59 swing, the supporting rollers 71 and 72 move on the supporting surface 73.

Figure 28:
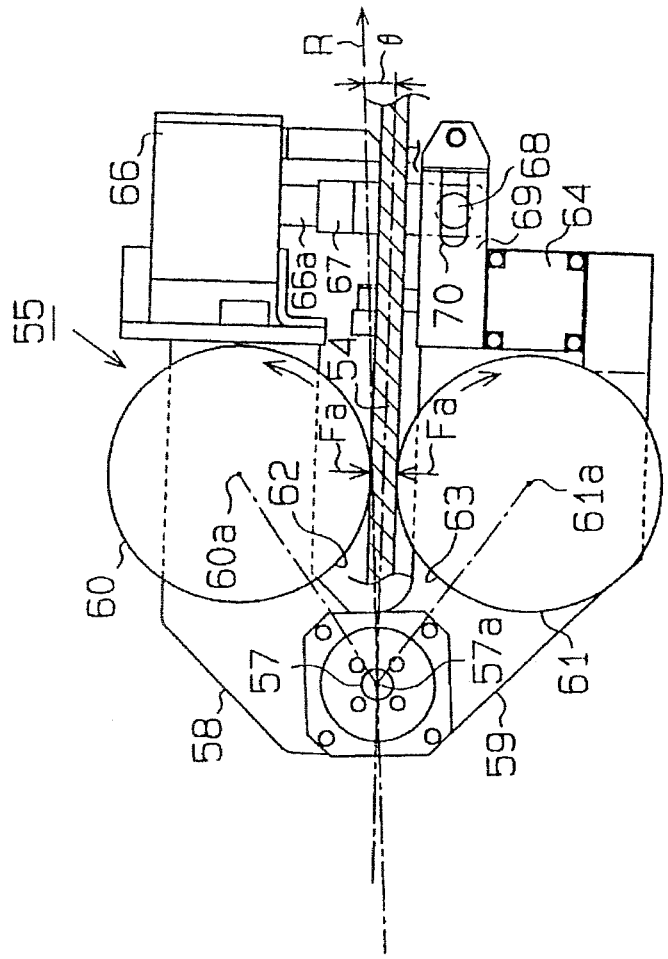
FIG. 28 is a plan view showing the state in which a driven portion is conveyed by both rollers when the extending direction of the driven portion aligns with the conveying route.

FIG. 28 shows the state when the driven portion 54 accurately mounted on the pallet 52 passes the conveying unit 55. In this case, the extending direction of the driven portion 54 aligns with the conveying route R. The driven portion 54 is inserted between both rollers 60 and 61, and the operation of the piston rod 66a of the air cylinder 66 causes the peripheral surfaces 62 and 63 of both rollers 60 and 61 to be pressed against the driven portion 54 at a constant force Fa. When the drive motor 64 rotates the drive roller 61, the rotation is transmitted to the driven portion 54 to move the driven portion 54 along the conveying route R. The movement of the driven portion 54 is transmitted to the follower roller 60 to cause the follower roller 60 to be rotated in the reverse direction of the drive roller 61. Accordingly, the pallet 52 is conveyed together with the driven portion 54 along the conveying route R.

Figure 29:
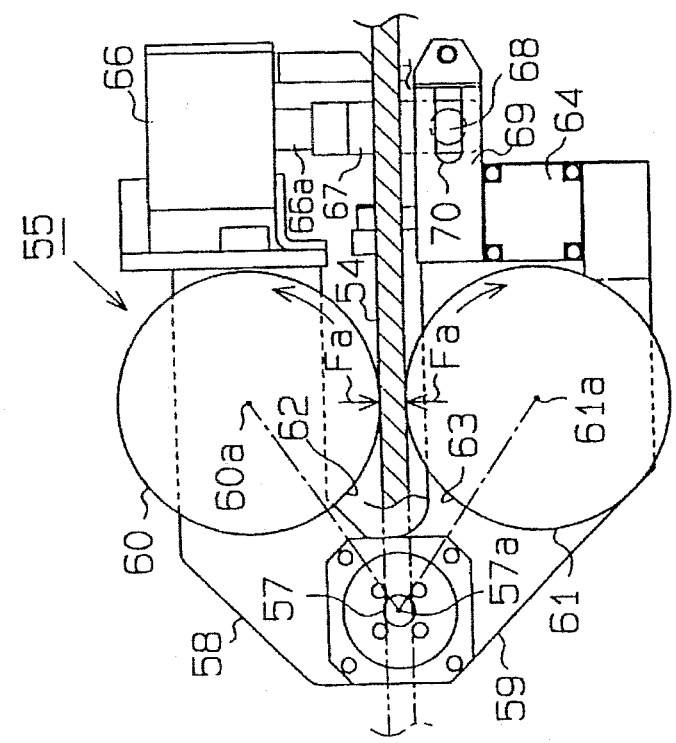
FIG. 29 is a plan view showing the state in which a driven portion is conveyed by both rollers when the extending direction of the driven portion deviates from the conveying route.

In FIG. 29, an error in mounting the driven portion 54 to the pallet 52 causes the extending direction of the driven portion 54 to slant by an angle $\Theta$ with respect to the conveying route R. In the present embodiment, even when the driven portion 54 slants as illustrated in the figure, both swing members 58 and 59, together with both rollers 60 and 61, swing to follow the slant of the driven portion 54. A horizontal excessive force perpendicular to the conveying route R is absorbed by this swing. Hence, the pallet 52 is smoothly conveyed without imposing a large load on the wheels 53 and associated components on the guide members.

If the efficiency of transmitting power from both rollers 60 and 61 to the driven portion 54 is made substantially equal for each pallet 52 by making both rollers 60 and 61 press against the driven portion 54 of each pallet at a constant force Fa as described above, each pallet 52 is apt to become identical in its conveying speed if other conditions are identical. Also, the rollers 60 and 61 will be freed of eccentric wear.

The present embodiment also has a feature not only in the conveying unit 55 but in the mechanism for conveying a plurality of pallets 52 in contact with each other by a plurality of conveying units 55. This mechanism will be described below in detail.

As shown in FIG. 30, the rails of an assembly line is divided into a plurality of zones $Z_1$, $Z_2$ and $Z_3$ (FIG. 30 shows an example of three divisions), from the upstream side (left-hand side in the figure) to the downstream side (right-hand side in the figure), according to work processes. Conveying units 91, 92 and 93 are disposed in the zones $Z_1$–$Z_3$, respectively, for conveying the pallet 52 at a predetermined conveying speed. A conveying unit 94 is disposed downstream from the conveying unit 93 in the zone $Z_3$ for conveying the pallet 52 faster than the predetermined conveying speed. Pallet groups, each comprising a plurality of pallets 52 (6 pallets in this example), are conveyed in sequence to the zones $Z_1$, $Z_2$ and $Z_3$.

Figure 22:
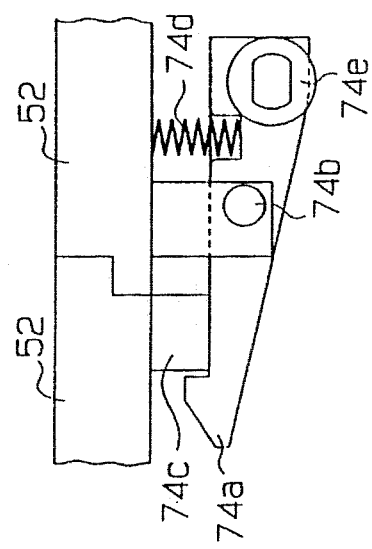
FIG. 22 is a partial side view showing the state that the linking hook of a following pallet has engaged with the engaging portion of a preceding pallet.
Figure 23:
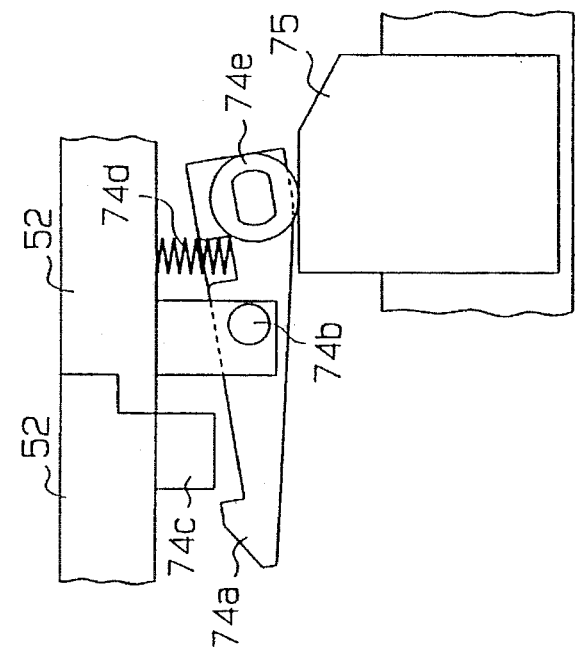
FIG. 23 is a partial side view showing the state that the linking hook shown in FIG. 22 is disengaged from the engaging portion.

As shown in FIGS. 20, 22 and 23, a linking hook 74a, which tilts about a support shaft 74b in the vertical direction, is provided on the underside of each pallet at the front end thereof in the conveying direction to be close to the inner surface of one guide rail 51. An engaging portion 74c is fixed on the underside of each pallet 52 at the rear end thereof in the conveying direction for engagement with the linking hook 74a.

The linking hook 74a can engage with the engaging portion 74c of the adjacent preceding pallet 52. In detail, a spring 74d is disposed between the linking hook 74a and the pallet 52. An elastic force of the spring 74d causes the linking hook 74a to engage with the engaging portion 74c of the preceding pallet 52 as shown in FIG. 22. Once this engagement is established, the preceding pallet 52 cannot move away from the following pallet 52.

In Zone $Z_3$, a cam 75 for unhooking is fixed to the guide rail 51. As shown in FIG. 23, when a cam roller 74e of the linking hook 74a comes in contact with the cam 75, the linking hook 74a disengages from the engaging portion 74c of the preceding pallet 52 against the elastic force of the spring 74d. This allows both adjacent pallets 52 to separate from each other.

As shown in FIGS. 30 and 31, a member to be detected 77 is mounted on the side face of each pallet 52. Also, a proximity switch 76 is mounted near the conveying unit 94 in the zone $Z_3$. The proximity switch 76 outputs an ON signal when the member to be detected 77 passes in front of the switch and outputs an OFF signal in other situations.

The proximity switch 76, and the drive motors 64 and the air cylinders 66 of conveying units 91–94 are connected to a controller 78. The controller 78 judges based on an output signal from the proximity switch 76 whether the pallet 52 has passed the zone $Z_3$. When the OFF signal is output from the proximity switch 76, the controller 78 directs the drive motors 64 to rotate at the same speed for rotating the drive rollers 61 of conveying units 91–94 at the same speed. When the ON signal is output from the proximity switch 76, the controller 78 drives the drive motor 64 of the conveying unit 94 to rotate at a higher speed than the drive motors 64 of other conveying units 91–93.

Also, the controller 78 controls the driving pressure of the air cylinders 66 of the conveying units 91–94 for adjusting the force for pressing both rollers 60 and 61 against the driven portion 54 of each pallet.

According to the conveying mechanism constructed as mentioned above, a plurality of pallets 52 are linked each other by means of the linking hook 74a, and the following pallet 52 pushes the preceding one for conveyance. Accordingly, the preceding and following pallets 52 reach the zone $Z_1$ in sequence. The driven portion 54 of each pallet is gripped between both rollers 60 and 61 of the conveying units 91–94 in the zones $Z_1$–$Z_3$ for conveying each pallet at the same speed.

FIGS. 30 and 31 show the state immediately after the driven portion 54 of the preceding pallet 52 has been gripped between both rollers 60 and 61 of the conveying unit 94. In this state, the member to be detected 77 is not opposed to the proximity switch 76 and hence, the OFF signal is output from the switch 76.

As the pallets 52 are further conveyed, the cam 75 acts on the linking hook 74a of the following pallet 52 linked with the preceding pallet 52. The linking hook 74a comes off the engaging portion 74c of the preceding pallet 52, thereby disconnecting the preceding pallet 52 from the following pallet 52.

Figure 32:
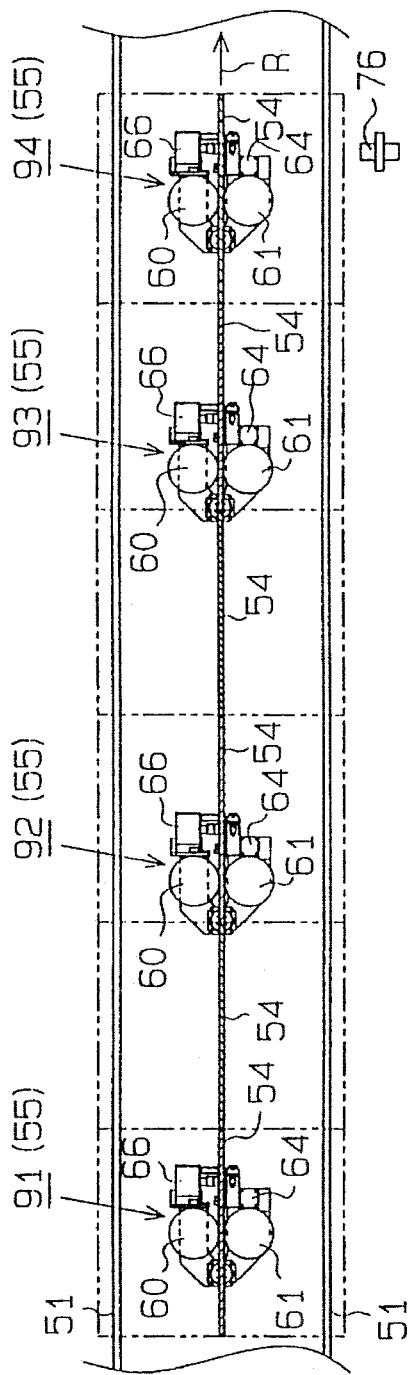
FIG. 32 is a schematic plan view of the conveyer from which pallets are removed and which shows the state in which a proximity switch has detected a detection member on the preceding pallet.
Figure 33:
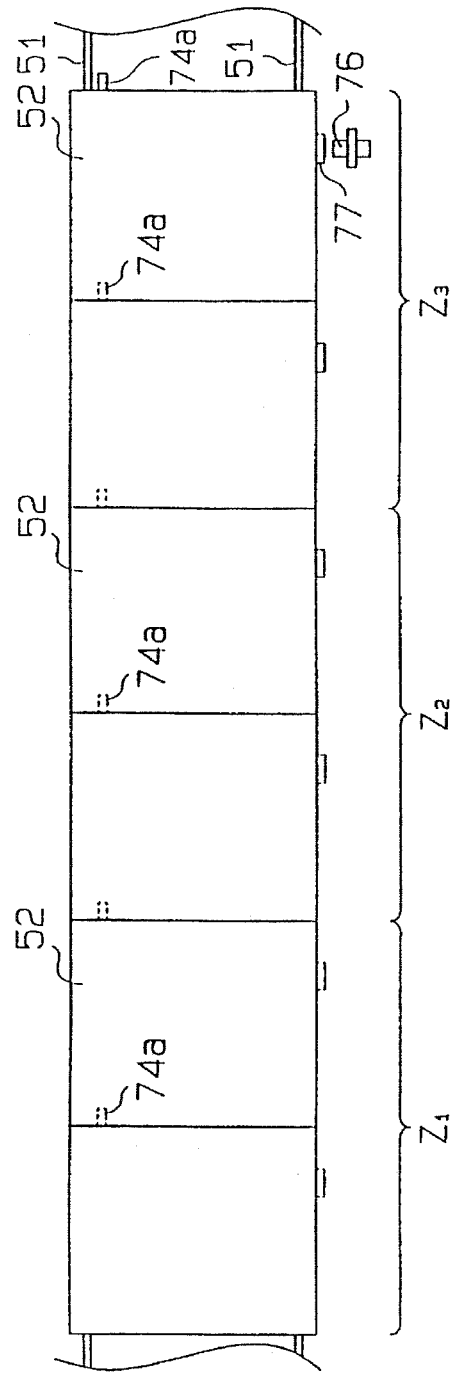
FIG. 33 is a schematic plan view of a conveyor showing the state in which the proximity switch has detected the detection member on the preceding pallet.
Figure 34:
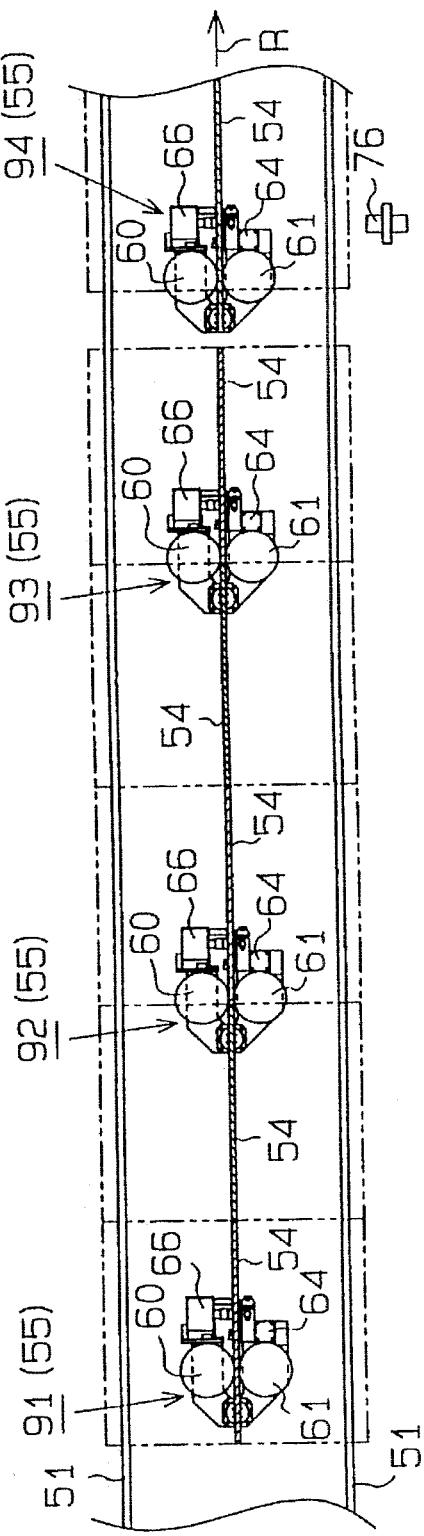
FIG. 34 is a schematic plan view of the conveyer from which pallets are removed and which shows the state immediately after the preceding pallet has been separated from the following pallets.
Figure 35:
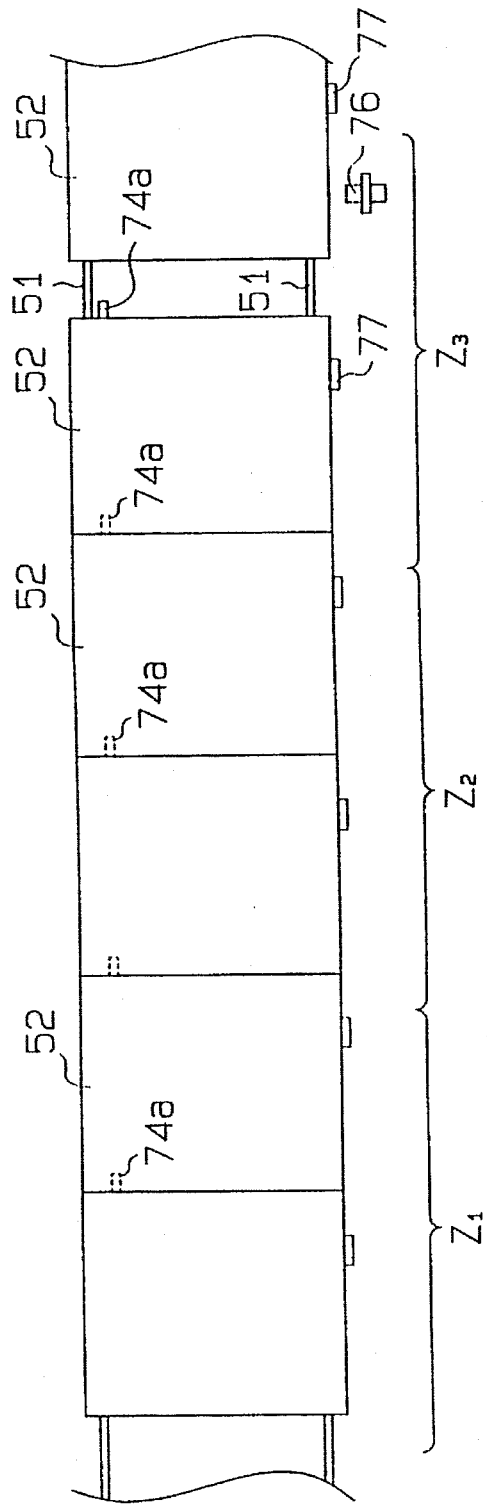
FIG. 35 is a schematic plan of the conveyer showing the state immediately after the preceding pallet has been separated from the following pallets.

Immediately after that, the member to be detected 77 is opposed to the proximity switch 76 and hence, the ON signal is output from the switch 76 as shown in FIGS. 32 and 33. This ON signal causes the drive motor 64 of the conveying unit 94 to increase its rotating speed, thereby increasing the rotating speed of the drive roller 61. Accordingly, the preceding pallet 52 is conveyed faster than the following pallet 52 as shown in FIGS. 34 and 35. The preceding pallet 52, away from the following pallet 52, is then conveyed to another zone apart from the zone $Z_3$.

This assembly line can be extended only by adding pallets and conveying units to existing equipment and changing the position of the proximity switch 76. Hence, the assembly line is easy to extend.

Also, the driven portion 54 of each pallet 52 receives a substantially uniform pressing force from both sides thereof for conveyance in sequence. Therefore, a specially large rigidity is not required of the pallet 52.

Moreover, even when some of conveying units 91–94 have trouble, workers may manually convey pallets 52 downstream from the troubled location. As a result, the downstream portion of the assembly line can continue operating, thereby allowing pallets 52 to be conveyed. Hence, the rails work can be continued, thereby preventing a deterioration in working efficiency.

Third Embodiment

A third embodiment of the present invention, particularly points of difference from the second embodiment, will be described with reference to FIGS. 36 to 42.

Figure 36:
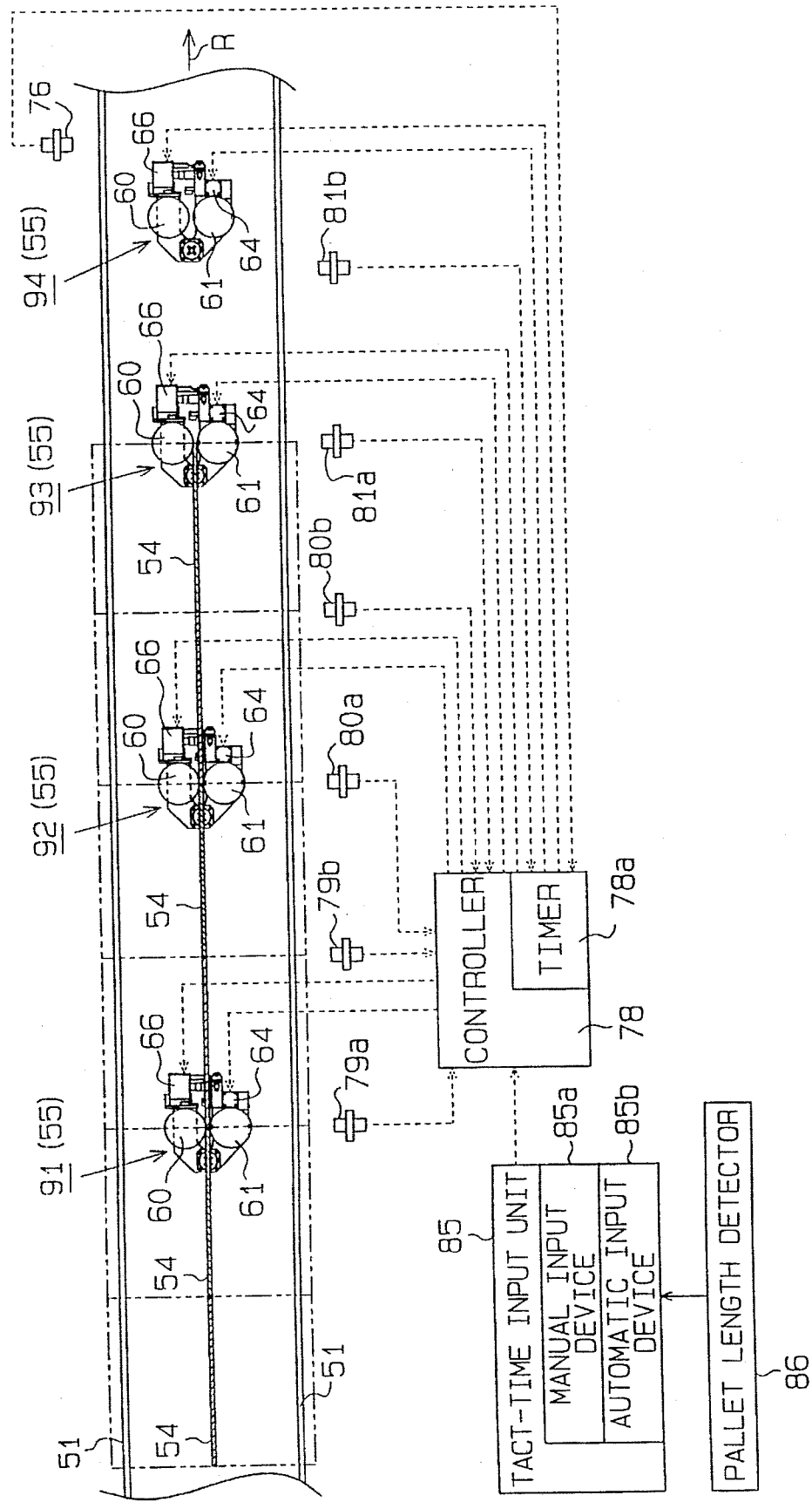
FIG. 36 is a partially cutaway schematic plan view of the conveyer from which pallets are removed and which shows the state in which upstream proximity sensors have detected members to be detected on pallets in a production line according to a third embodiment of the present invention.
Figure 37:
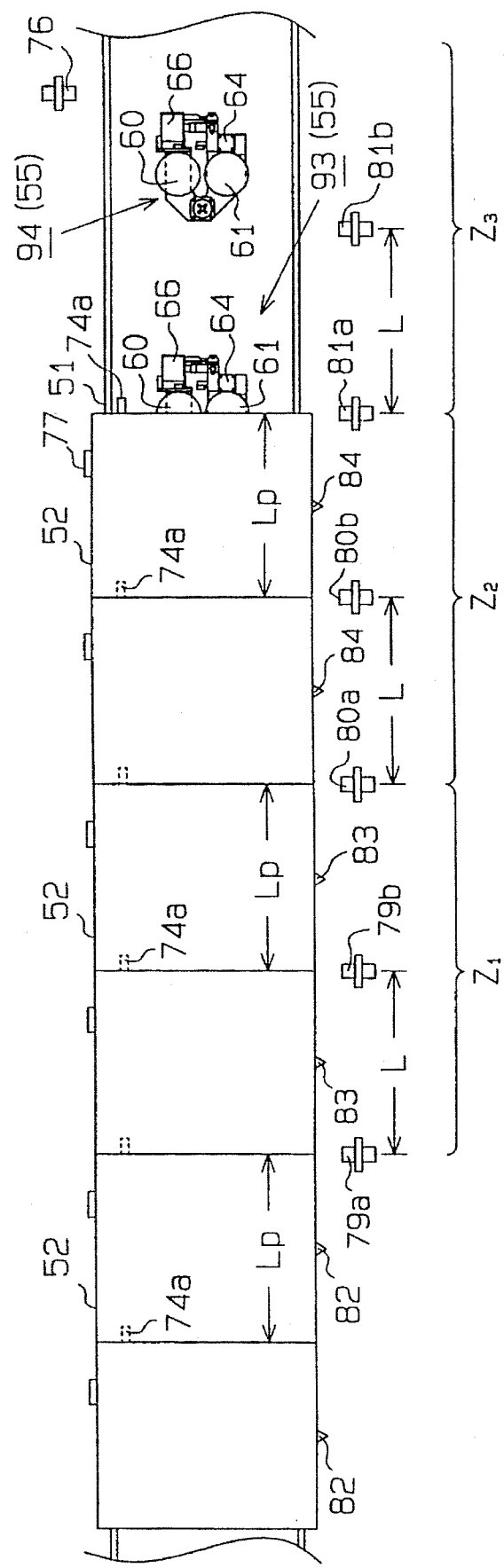
FIG. 37 is a schematic plan view of the conveyer showing the state in which the upstream proximity sensors have detected the members to be detected on the pallets.

As shown in FIGS. 36 and 37, the rails of an assembly line is divided into a plurality of zones $Z_1$, $Z_2$ and $Z_3$ (the figure shows an example of three divisions), from the upstream side (left-hand side in the figure) to the downstream side (right-hand side in the figure), according to work processes. Conveying units 91, 92 and 93 are disposed in the zones $Z_1$–$Z_3$, respectively, in the most upstream positions thereof. Moreover, in the zone $Z_3$, a conveying unit 94 is disposed downstream apart from the conveying unit 93. Pallet groups, each comprising a plurality of pallets 52 (6 pallets in this example), are conveyed in sequence to the zones $Z_1$, $Z_2$ and $Z_3$.

Pairs of proximity sensors (79a, 79b), (80a, 80b) and (81a, 81b) are disposed outside either guide rail 51 near conveying units 91–93. The proximity sensors 79b, 80b and 81b are located a certain distance downstream from the proximity sensors 79a, 80a and 81a of the same pair along the conveying route R. The distance L between the proximity sensors 79a and 79b, the distance L between the proximity sensors 80a and 80b, and the distance L between the proximity sensors 81a and 81b are all the same. These distances L are equal to the length Lp of each pallet 52 of the same type in the conveying direction.

One of members to be detected 82, 83 and 84 is mounted on the side face of each pallet 52 at the central portion thereof. The proximity sensors 79a, 79b, 80a, 80b, 81a and 81b output an ON signal when any of members to be detected 82–84 passes in front of them, and the proximity sensors output an OFF signal in other situations.

The proximity sensors 79a–81a and 79b–81b, the drive motors 64 and air cylinders 66 of the conveying units 91–94, and the proximity switch 76 are connected to a controller 78. Also, an input unit 85 is connected to the controller 78.

The input unit 85 is used to set a time required for each pallet 52 to pass each zone of $Z_1$, $Z_2$ and $Z_3$ (tact-time), and comprises a manual input device 85a including a keyboard. A worker operates the device 85a to set the tact time. Data items to be set include, for example, the type of the pallet 52. When the pallet type is input, the controller 78 calculates and stores a target value of the time required until the outputting of the ON signal from the upstream proximity sensors 79a, 80a and 81a after the ON signal was output from the downstream proximity sensors 79b, 80b and 81b, respectively.

Figure 40:
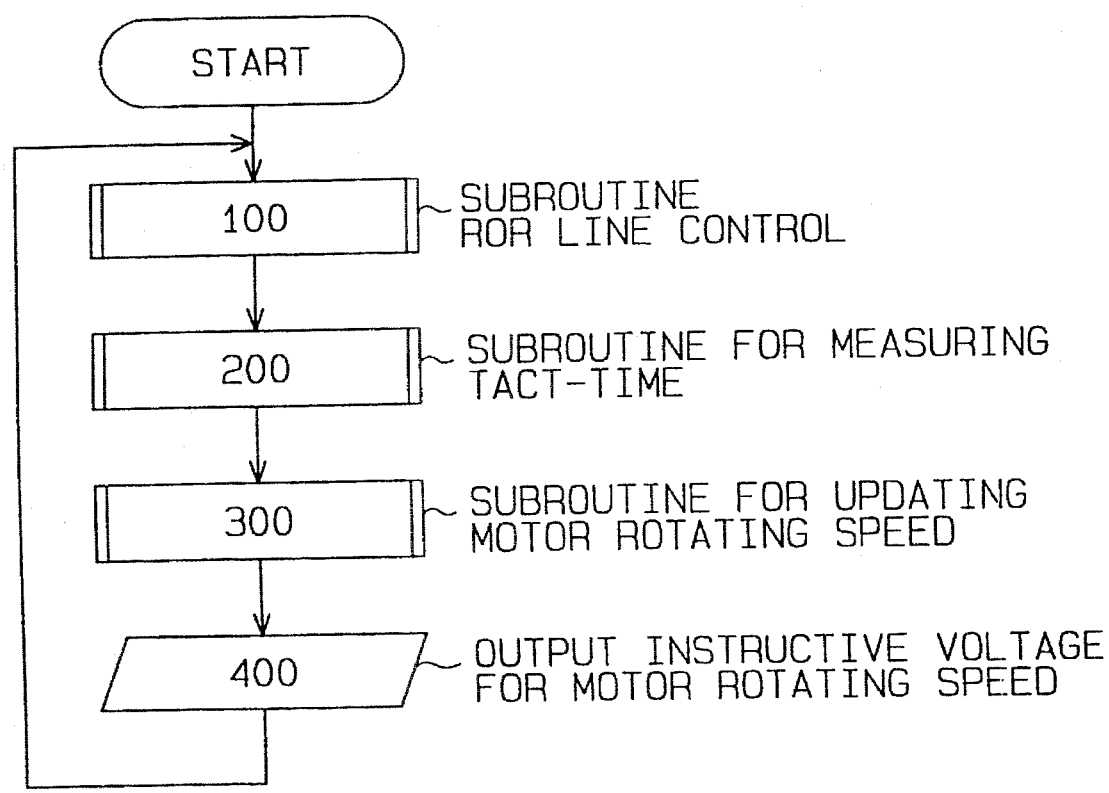
FIG. 40 is a flow chart showing a main routine to be executed by a controller.

Next, the actions and effects of the third embodiment will be described. FIG. 40 is a flow chart showing a main routine to be executed by the controller 78. This main routine comprises three subroutines (steps 100, 200 and 300) and the process for outputting an instruction signal to the drive motor 64 (step 400). The controller 78 repeatedly executes these steps 100–400.

Step 100 is a subroutine for performing an overall control over an assembly line, and this routine outputs signals for automatic assembling work as well as manual work. Step 200 is a subroutine for measuring an actual time required for the pallet 52 to move over a predetermined distance (tact-time). Step 300 is a subroutine for updating the rotating speed of the drive motor 64.

Figure 41:
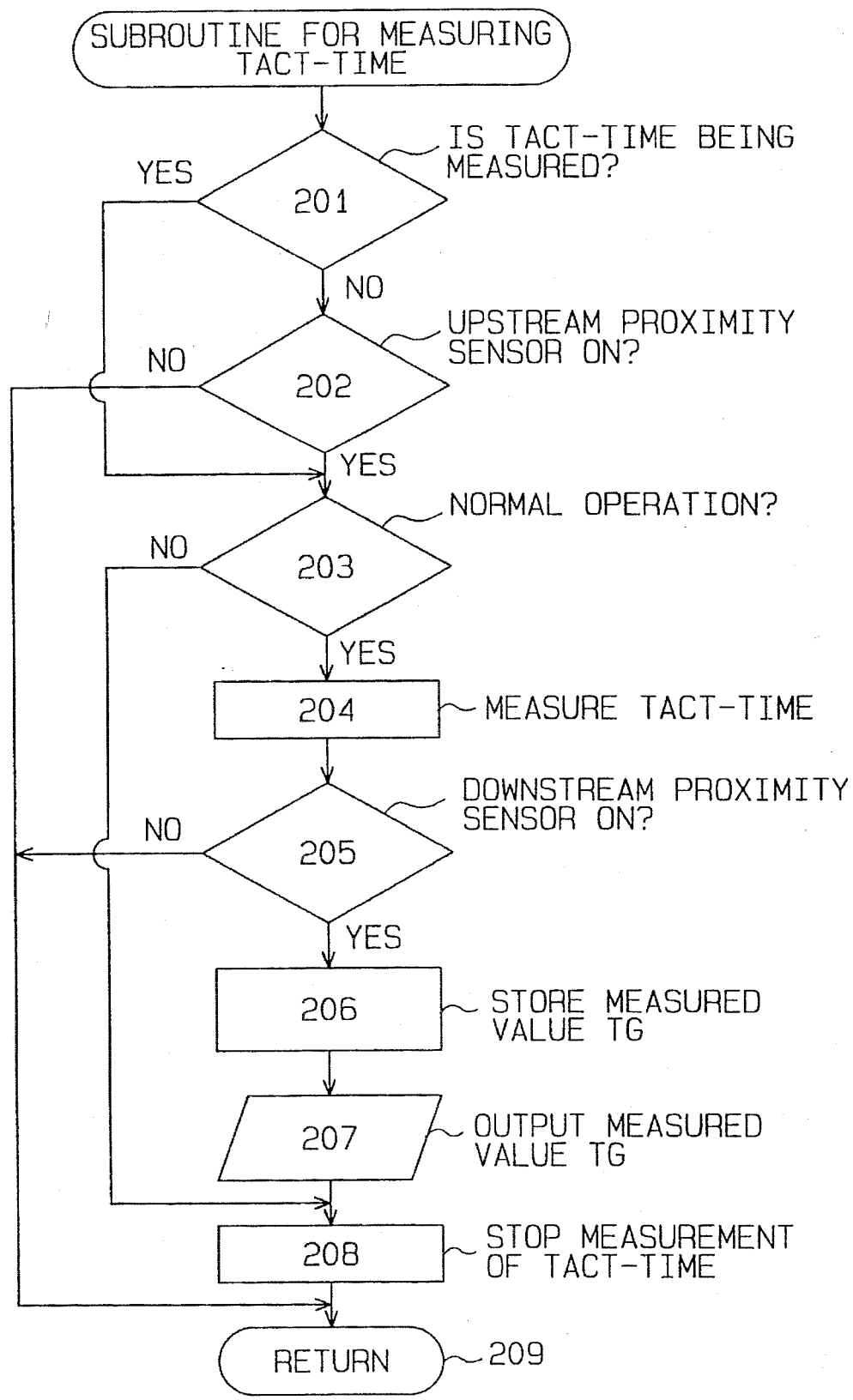
FIG. 41 is a flow chart showing a subroutine for measuring a tact-time shown in FIG. 40.

Next, the subroutine of step 200 will be described in detail with reference to a flow chart in FIG. 41. The main routine is interrupted at predetermined times to execute this subroutine.

It step 201, the controller 78 judges whether the tact-time is being measured based on output signals from the proximity sensors 79a–81a and 79b–81b. The controller 78 will jump to step 203 if the tact-time is being measured, and will go to step 202 if not.

In step 202, the controller 78 judges whether the ON signal is output from the upstream proximity sensors 79a–81a of individual pairs. When the members to be detected 82–84 are opposed to the proximity sensors 79a–81a as shown in FIGS. 36 and 37 and hence, when the ON signal is output from the sensors 79a–81a, the controller 78 jumps to step 203.

If it is judged in step 202 that the ON signal is not output from the upstream proximity sensors 79a, 80a and 81a, the controller 78 will jump to step 209 to return to the main routine, understanding that the tact-time is not being measured and also that the timing for starting the measurement of the tact-time has not arrived yet.

In step 203, the controller 78 judges whether the assembly line is normally run under proper line control. When the assembly line is running normally, the controller 78 measures the tact-time in step 204. Accordingly, a timer 78a in the controller 78 measures the elapsed time after the ON signal has been output from the upstream proximity sensors 79a–81a.

In step 205, the controller 78 judges whether the ON signal is output from the downstream proximity sensors 79b–81b. If the members to be detected 82–84 are opposed to the downstream proximity sensors 79b–81b and also if the ON signal is not output from the sensors 79b–81b, the controller 78 will jump to step 209 to return to the main routine. If the ON signal is output from the sensors 79b81b as shown in FIGS. 38 and 39, the controller 78 stores the time, as a measured value TG, in step 206. The time represents a time length which is required for the members to be detected 82–84 to move over a predetermined range (distance L) between upstream proximity sensors 79a–81a and downstream proximity sensors 79b–81b, respectively Then, the controller 78 outputs the measured value TG in step 207, terminates the process of measuring the tact-time in step 208, and then goes to step 209 to return to the main routine.

Incidentally, when the controller 78 judges that the assembly line is not running normally in step 203, the controller jumps to step 208 to terminate the process of measuring the tact-time without executing the processes in steps 204–207, and then goes to step 209 to return to the main routine.

As described above, when the subroutine in FIG. 41 is executed, the tact-time is measured and output during conveying each pallet 52.

Figure 42:
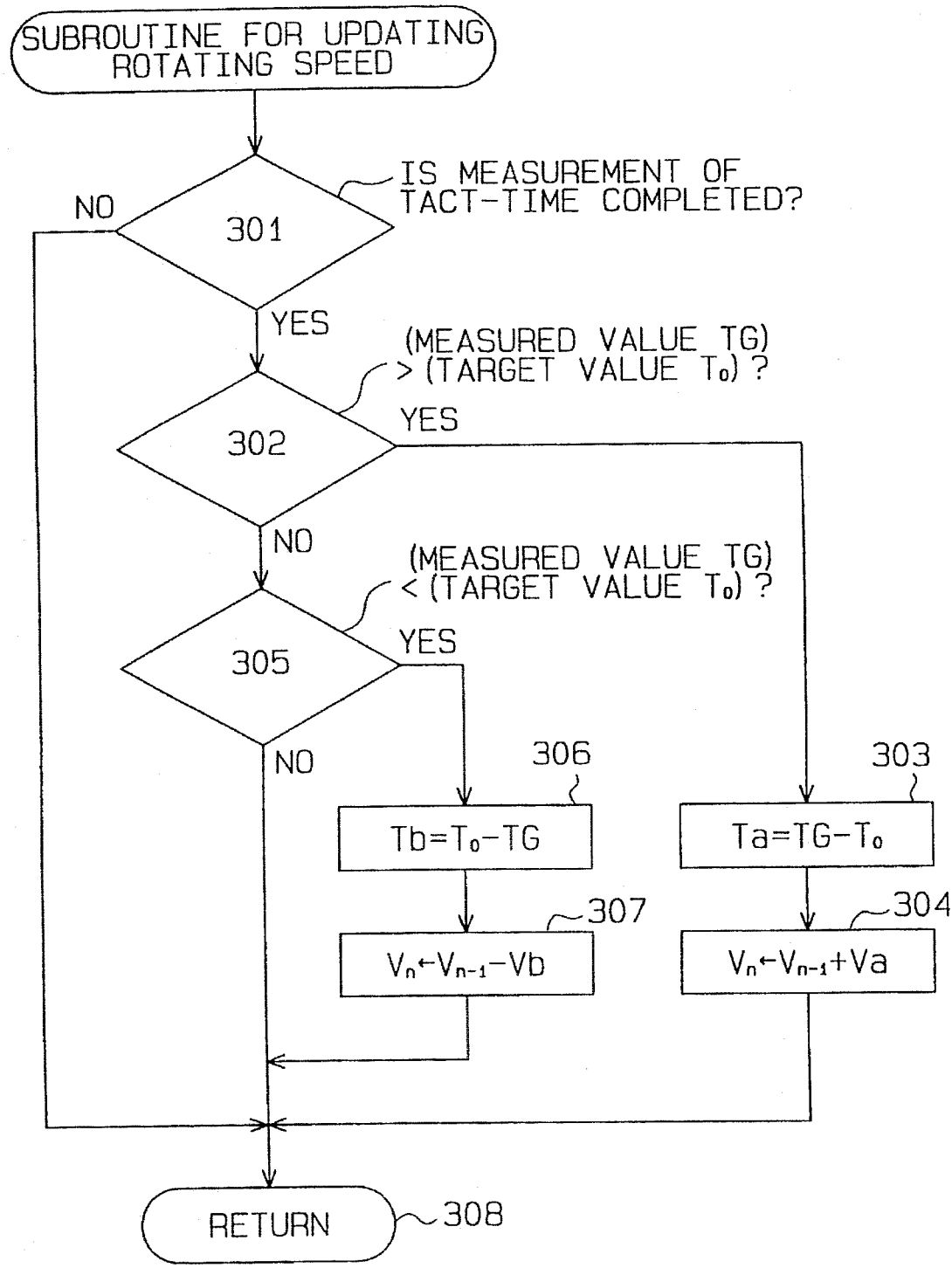
FIG. 42 is a flow chart showing a subroutine for changing target values shown in FIG. 40.
Figure 43:
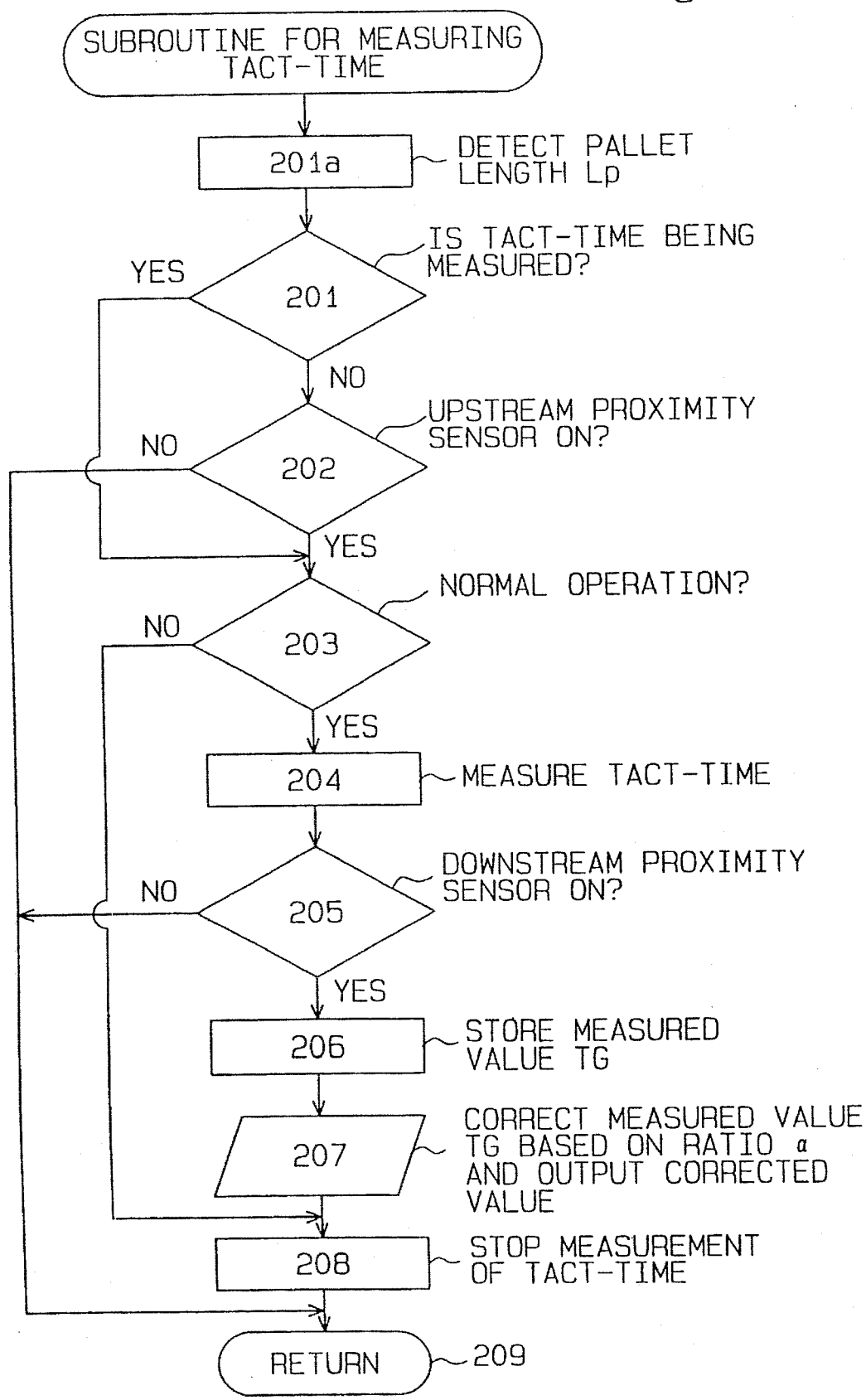
FIG. 43 is a flow chart showing another embodiment of the subroutine shown in FIG. 41.
Figure 44:
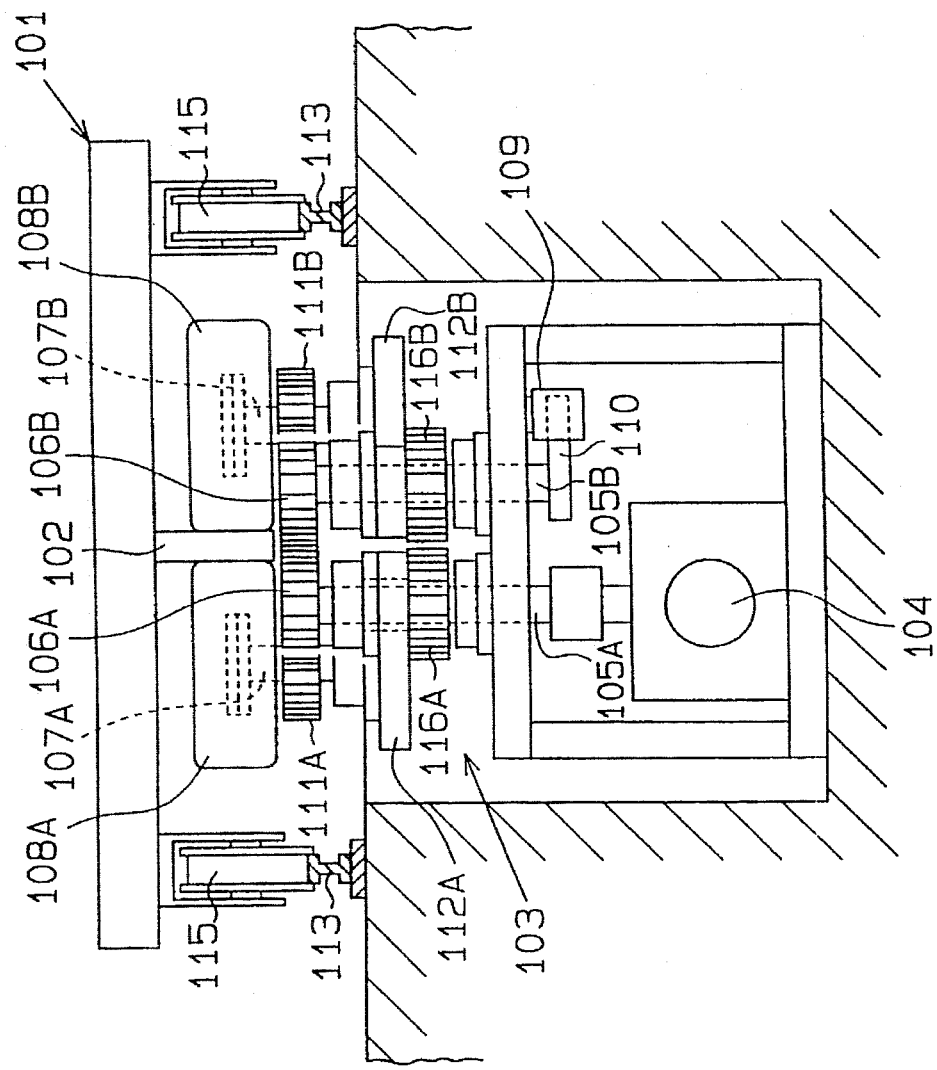
FIG. 44 is a front view showing the conveying unit of a conventional conveying apparatus.
Figure 45:
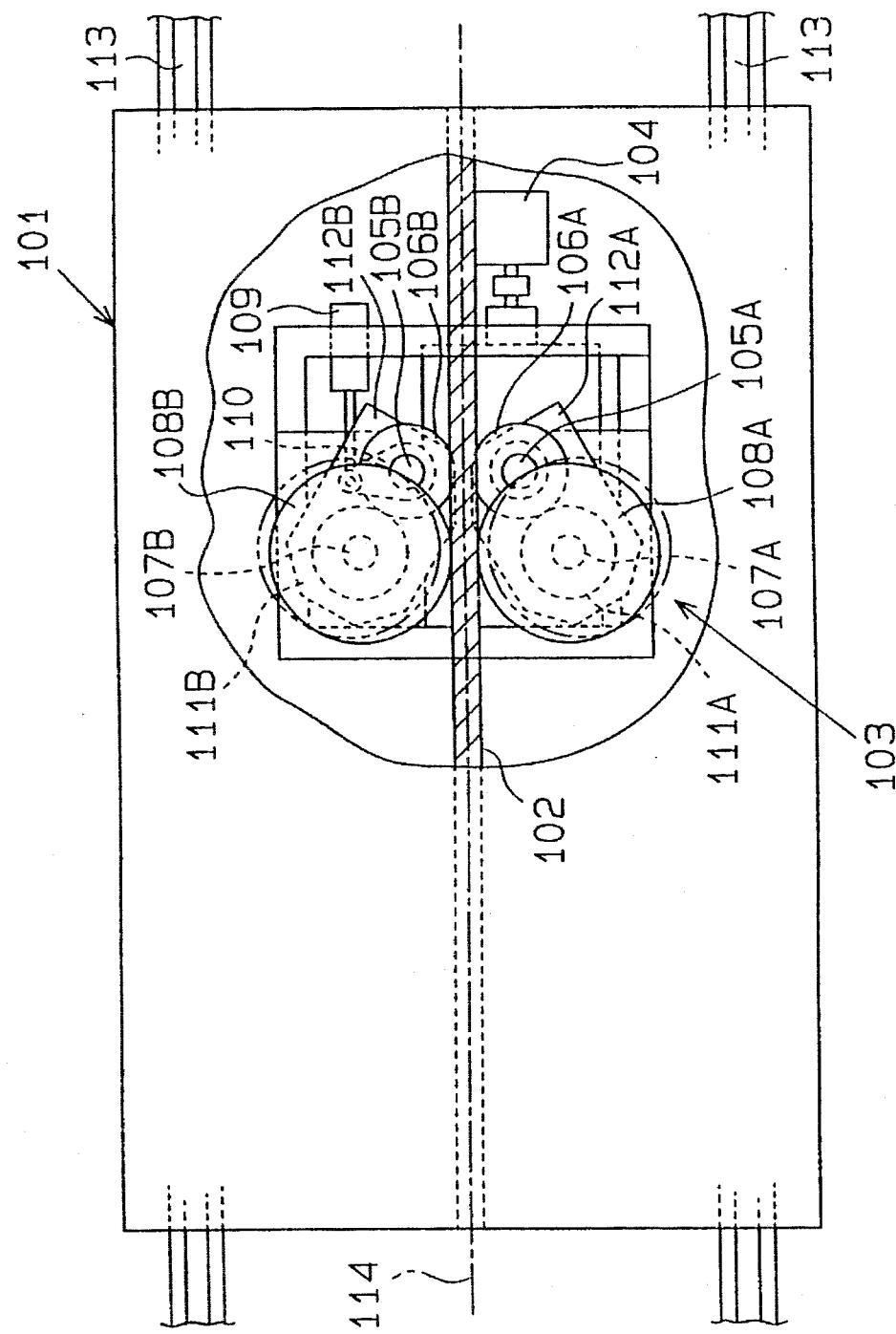
FIG. 45 is a partially cutaway plan view of the conveying unit shown in FIG. 44.

Next, the subroutine of step 300 will be described in detail with reference to a flow chart in FIG. 42. The main routine is interrupted at predetermined times to execute this subroutine.

First, in step 301, the controller 78 judges whether the measurement of the tact-time has been completed. If the measurement is not completed, the controller 78(3) will jumps to step 308 to return to the main routine. If the measurement is completed, the controller 78 will judge in step 302 whether the measured value TG is greater than a target value $T_o$ (previously stored target traveling time).

When the measured value TG is greater than $T_o$ (TG>$T_o$), the controller 78 calculates the deviation between these values $T_a$ (=TG–$T_o$) in step 303. Then, in step 304, the controller 78 obtains a correction value $V_a$ (>0) for the rotating speed in correspondence with the deviation $T_a$, and adds the correction value $V_a$ to the last instructed motor rotating speed $V_{n-1}$. The value obtained from the addition is used as a new instruction value $V_n$. The correction value $V_a$ is calculated from a previously prepared map of correction values in correspondence with the deviation $T_a$. Then, the controller 78 goes to step 308 to return to the main routine.

When the measured value TG is found not greater than the target value $T_o$ (TG≧$T_o$) in step 302, the controller 78 judges whether the measured value TG is smaller than the target value $T_o$ in step 305. When the measured value TG is smaller than $T_o$ (TG<$T_o$), the controller calculates the deviation between these values $T_b$ (=$T_o$–TG) in step 306. Then, in step 307, the controller 78 obtains a correction value $V_b$ (>0) for the rotating speed in correspondence with the deviation $T_b$, and subtracts the correction value $V_b$ from the last instructed motor rotating speed $V_{n-1}$. The value obtained from the subtraction is used as a new instruction value $V_n$. The correction value $V_b$ is calculated from a previously prepared map of correction values in correspondence with the deviation $T_b$. Then, the controller 78 goes to step 308 to return to the main routine.

When the measured value TG is found not smaller than the target value $T_o$ in step 305, the controller 78 judges that the measured value TG agrees with the target value $T_o$ (TG=$T_o$), and goes to step 308 to return to the main routine without making the above-mentioned correction.

As steps 301–307 are repeated, the measured value TG converges to the target value $T_o$, thereby conducting so-called feedback control.

Accordingly, the rotating speed of the drive motor 64 is controlled in each zone of $Z_1$, $Z_2$ and $Z_3$, and consequently, pallets 52 become identical in conveying speed. Pallets 52, therefore, are conveyed in sequence under a mutually imposed uniform contact force.

Then, as in the case of the second embodiment, the preceding pallet 52 is conveyed at a faster speed than the following pallet 52 and moves away from the latter.

Although only three embodiments of the present invention have been described herein, it should be apparent to those skilled in the art that the present invention may be embodied in many other specific forms without departing from the spirit or scope of the invention. Particularly, it should be understood that the present invention may be embodied in forms as described below.

(1) In place of the post 29 for changing the conveying direction in the first embodiment, an extended portion may be added to the supporting plates 20 and 23 of conveying units 18, 28, 31 and 32 so that the extended portion comes in contact with the movable driven portion 12 for aligning the movable driven portion with the stationary driven portions 16 or 17.

(2) In place of the reed switch 34 in the first embodiment, a pressure switch may be mounted on the air cylinder 27 so that a change of pressure in the cylinder 27 is detected by this pressure switch for checking a change in the reaction force F. Also, various kinds of sensors may be used for detecting a change in the reaction force F.

(3) In the first embodiment, the pallet 4 which has just changed the conveying direction, is checked for the state of contact. In this connection, the conveying unit 36 for conveying pallets straight may be mounted with the same air cylinder 27 as for the conveying unit 31 for changing the conveying direction. The set pressure of the air cylinder 27 is adjusted so as to endure the reaction force F in the normal state, so that the occurrence of an abnormality is detected in the form of a change in the reaction force F caused by the abnormality.

(4) In the first embodiment, the stationary driven portions 16 and 17 of the pallet 4 may be omitted to constitute the driven portion only with the movable driven portion 12.

(5) In the second embodiment, the support shaft 57 may be changed to two support shafts so that each of the swing members 58 and 59 swings about each of the support shafts 57.

(6) In the second embodiment, the swinging direction of the swing members 58 and 59 is not strictly defined as a direction perpendicular to the conveying route in the plane of conveying path, but includes a certain angular range. This swinging direction means a direction which allows both rollers 60 and 61 to follow a change in the extending direction and width W of the driven portion 54.

(7) In the second embodiment, a pair of swing members which move perpendicularly to the conveying route R independent of and in parallel with each other, may be located with a drive roller supported on one swing member and a follower roller supported on the other swing member. Moreover, a mechanism for pressing both rollers 60 and 61 against the driven portion 54 of the pallet 52 from both sides thereof (air cylinder 66, interlocking arm 67, interlocking pin 68 and interlocking portion 69 in the second embodiment) may be disposed between the pair of swing members.

(8) In the second embodiment, both swing members 58 and 59 may be attached to the support shaft 57 for swinging movement as one unit. In this case, the mechanism described above in (6) is omitted, and the center-to-center distance between the rollers 60 and 61 is made adjustable. Likewise, both swing members described above in (6) may be made movable in parallel as one unit, and the center-to-center distance between both rollers may also be made adjustable.

(9) In the second embodiment, both rollers 60 and 61 may be driven.

(10) In the second embodiment, in place of the proximity switch 76 and the detection member 77, a limit switch and a contact member which comes in contact with the switch to turn on/off the switch, may be used.

(11) In the third embodiment, the time required for each pallet 52 to move over a predetermined distance is measured, and the measured actual traveling time and a target traveling time are directly compared for controlling the drive motor 64. In place of this method, comparative matters such as the actual traveling speed of each pallet 52 may be calculated based on the measured actual time required for each pallet 52 to move over a predetermined distance, and measured values of such comparative matters may be compared with their target values for conducting feedback control as in the third embodiment.

(12) In the third embodiment, in place of the proximity sensors 79a–81a and 79b–81b and the members to be detected 82–84, limit switches and contact members which come in contact with the switches to turn on/off the switches, may be used.

(13) In the third embodiment, the distance L between the upstream proximity sensors 79a–81a and corresponding downstream proximity sensors 79b–81b may be different from the length Lp of each pallet 52. In this case, the ratio between the length L and the length Lp is used for correcting the measured value TG in the third embodiment.

(14) In the third embodiment, pallets 52 of the same length Lp are conveyed continuously. However, there may be the need for conveying a group of pallets of different length Lp. In such a case, if a worker inputs data and commands using the manual input device 85a of the input unit 85, it will not catch up with the actual work flow and be disadvantageous in terms of workability.

Hence, an automatic input device 85b may be added to the input unit 85, and a detector 86 may be connected to the device 85b for detecting the length Lp of the pallet 52. The detector 86 is located so as to detect the length Lp of each pallet 52 before the pallet 52 enters the upstream zone $Z_1$. The detector 86 may be a proximity sensor used in the third embodiment, a limit switch, or a photoelectric switch. Also, a combination of a bar code indicative of the length of the pallet 52 attached thereto and a bar code reader to read the bar code data may be used.

The automatic input device 85b outputs the length Lp of the pallet 52 to the controller 78 based on an input signal from the detector 86. In this case, in addition to processes of subroutines in FIG. 41, the controller 78 detects the length Lp of the pallet 52 in step 201a, and corrects the measured value TG based on the ratio α between the detected length Lp and a reference length and outputs the corrected value in step 207.

Therefore, the present examples and embodiments are to be considered as illustrative and not restrictive and the invention is not to be limited to the details given herein, but may be modified within the scope of the appended claims.

What is claimed is:

1. A conveying system in a production line for conveying a plurality of objects, said system having a plurality of conveying units arranged along a conveying route of the production line, each conveying unit including a pair of rollers for clamping an elongated driven portion formed with each object to convey the object by rotating the rollers in opposite directions by roller rotating mechanics, wherein objects successively fed into the conveying route are brought into contact with each other by the action of the conveying units to form a train of the objects, said system comprising:

first parallel rails and second parallel rails extending in different directions from each other and crossing each other at an intersection of said conveying route;

a moveable section formed with at least a part of said driven portion and supported on said object for rotational movement, said moveable section being directionally aligned with one of a first conveying unit and a second conveying unit by which the object is conveyed;

said first conveying unit disposed between the first rails in the vicinity of the intersection;

said second conveying unit disposed between the second rails in the vicinity of the intersection;

a first mechanism, provided with the first conveying unit for advancing the rollers of the first conveying unit to abut the driven portion of the object when the object on the first rails is close to the intersection and for retracting the rollers from the driven portion of the object when the object is in the intersection;

a second mechanism, provided with the second conveying unit for advancing the rollers of the second conveying unit toward the intersection when the object is in the intersection and for advancing the rollers of the second conveying unit away from the intersection when the rollers abut the driven portion of the object at the intersection; and a third mechanism, secured to the intersection, for rotating the moveable section from a position along the first rails to a position along the second rails for changing the conveying direction of the object without changing a posture of the object when the object is in the intersection.

2. The conveying system as set forth in claim 1, wherein said driven portion includes a first pair of fixed sections extending in the same direction as the first rails outside the rotating orbit of the moveable section, and a second pair of fixed sections extending in the same direction as the second rails outside the rotating orbit of the moveable section.

3. The conveying system as set forth in claim 1, wherein said first mechanism includes a first air cylinder having a piston rod coupled With the rollers and reciprocatable along the first rails.

4. The conveying system as set forth in claim 1, wherein said second mechanism includes a first air cylinder having a piston rod coupled with the rollers and reciprocatable along the second rails.

5. The conveying system as set forth in claim 1, wherein said third mechanism includes a post for contacting the movable section and rotating the moveable section in cooperation with the advancing force applied to the second rails from the second conveying unit when the object is conveyed from the intersection toward the second rails.

6. The conveying system as set forth in claim 1 further comprising:

a support pipe fixed to each object;

a support shaft fixed to the moveable section and rotatably inserted into the support pipe;

a fourth mechanism, provided between the support pipe and the support shaft, for prohibiting the rotation of the moveable section when the moveable section comes to alignment with a selected one from a group consisting of the first rails and the second rails.

7. The conveying system as set forth in claim 6, wherein said fourth mechanism includes a ball and a spring biasing the ball to a rotation center of the support shaft.

8. The conveying system as set forth in claim 1, wherein said driven portion consists of the moveable section.

9. A conveying system in a production line for conveying a plurality of objects, said system having a plurality of conveying units arranged along a conveying route of the production line, each conveying unit including a pair of rollers for clamping an elongated driven portion formed with each object to convey the object by rotating the rollers in opposite directions by a roller rotating mechanism, wherein objects successively fed into the conveying route are brought into contact with each other by the action of the conveying units to form a train of the objects, said system comprising:

each conveying unit disposed in a location where a preceding object is separated from a following object in the train;

a mechanism, linked to the rollers of one of the plurality of conveying units, for advancing the rollers abutting against the elongated driven portion of the following object toward the preceding object at a speed faster than a speed of conveyance obtained by rolling the rollers when the preceding object is separated from the following object, and for retracting the rollers when the following object comes in contact with the preceding object due to the advance movement;

means for detecting a state of the mechanism after the mechanism has moved the rollers of said conveying unit; and means for determining whether the following object has received a reaction force from the preceding object when the mechanism has brought the following object in contact with the preceding object.

10. The conveying system as set forth in claim 9, wherein said mechanism includes an air cylinder having a piston rod coupled with the rollers and reciprocatable along the conveying route.

11. The conveying system according to claim 10, wherein said detecting means includes a reed switch attached to the air cylinder for generating a first signal when the piston rod has operated to advance the rollers, and for generating a second signal when the piston rod has moved in reverse under a reaction force applied by the preceding object to the following object.

12. The conveying system as set forth in claim 10, wherein said detecting means includes a pressure switch attached to the air cylinder for generating a specific signal when pressure in the air cylinder pressure has reached a predetermined value and for generating a different signal from said specific signal when the pressure deviates from said predetermined value.

13. A method of conveying a plurality of objects, said objects successively fed to a production line having a plurality of conveying units, each conveying unit including a pair of rollers for contacting an elongated driven portion attached to each object and rotated in opposite directions by a roller rotating mechanism to advance each object, wherein the objects contact each other, said method comprising the steps of:

determining a target conveying speed for each object;

detecting an actual conveying speed of each object; and controlling the roller rotating mechanism of each conveying unit to rotate at the target conveying speed.

14. A conveying system for conveying a plurality of objects in a production line, said system having a plurality of conveying units arranged along a conveying route of the production line, each conveying unit including a first roller and a second roller for clamping an elongated driven portion formed with each object to convey the object by rotating the rollers in opposite directions by a roller rotating mechanism, wherein the objects successively fed into the conveying route are brought into contact with each other by the action of the conveying units to form a train of the objects, said system comprising:

means for determining a target conveying speed for each object;

means for detecting an actual conveying speed of each object; and means for controlling the roller rotating mechanism of each conveying unit to rotate at the target conveying speed.

15. The conveying system as set forth in claim 14, wherein said detecting means includes:

a plurality of proximity sensors arranged along the conveying route;

said object including a member to be detected by the proximity sensors; and means for measuring the elapsed time between the detections of said member by the proximity sensor and by the the next downstream proximity sensor.

16. The conveying system as set forth in claim 14, wherein said setting means includes an input device having a keyboard.

17. A conveying system in a production line for conveying a plurality of objects, wherein said system has a plurality of conveying units arranged at appropriate intervals between a pair of guide members along a conveying route of the production line, each conveying unit comprising:

a base fixed between the guide members;

a support shaft mounted on said base;

a first swing member pivotably supported by said support shaft;

a second swing member pivotably supported by said support shaft, wherein said second swing member is pivotable separately from said first swing member;

a first roller rotatably supported by said first swing member;

a second roller rotatably supported by second swing member;

a motor mounted on said second swing member to actuate said second roller;

a cylinder mounted on said first swing member to drive said first roller and said second roller selectively toward and away from each other by driving a rod connected to said second swing member so that said first swing member and said second swing member both swing around the support shaft, whereby a driven portion arranged for movement with at least one of the plurality of objects may be clamped by said first roller and said second roller.

18. The conveying system according to claim 17, wherein said swing members are arranged to swing perpendicular to a direction of conveying along the conveying route and in a plane of the conveying route.

19. The conveying system according to claim 18, further comprising a mechanism, disposed between the swing members, for urging the rollers against the driven portion from both sides thereof.

20. The conveying system according to claim 19, wherein the urging mechanism is disposed between distal ends of the swing member, said rod comprises a piston rod and said cylinder comprises an air cylinder wherein said air cylinder changes the spacing between said distal ends by moving said piston rod.

21. The conveying system according to claim 17, wherein said first roller is operably connected to a roller rotating mechanism, and said second roller rotates through contact with the driven portion that is conveyed by the rotation of said first roller.

22. The conveying system according to claim 17, wherein both rollers are operably connected to a roller rotating mechanism.

23. The conveying system according to claim 17, further comprising a roller rotating mechanism and means for controlling the roller rotating mechanism to rotate the rollers of a plurality of conveying units at the same speed.

* * * * *